United States Patent [19]

Sakaida et al.

[11] Patent Number: 5,028,834
[45] Date of Patent: Jul. 2, 1991

[54] DEVICE FOR MAGNIFYING DISPLACEMENT OF PIEZOELECTRIC ELEMENT AND METHOD OF PRODUCING SAME

[75] Inventors: Atsuo Sakaida, Gifu; Yoshiyuki Ikezaki; Akira Iriguchi, both of Nagoya; Yasuji Chikaoka, Aichi; Yasuo Imoto, Nagoya, all of Japan

[73] Assignee: Brother Kogyo Kabushiki Kaisha, Aichi, Japan

[21] Appl. No.: 375,403

[22] Filed: Jul. 3, 1989

[30] Foreign Application Priority Data

| Jul. 21, 1988 | [JP] | Japan | 63-182063 |
| Jul. 29, 1988 | [JP] | Japan | 63-191127 |
| Aug. 19, 1988 | [JP] | Japan | 63-206539 |
| Aug. 23, 1988 | [JP] | Japan | 63-209173 |
| Oct. 20, 1988 | [JP] | Japan | 63-264979 |

[51] Int. Cl.$^5$ .............................................. H01L 41/08
[52] U.S. Cl. ................................... 310/328; 310/346
[58] Field of Search ............................. 310/328, 346

[56] References Cited

U.S. PATENT DOCUMENTS

| 3,524,196 | 8/1970 | Church et al. | 310/328 |
| 3,614,486 | 10/1971 | Smiley | 310/328 |
| 3,649,857 | 3/1972 | Knappe | 310/328 |
| 3,955,049 | 5/1976 | MacNeil et al. | 310/328 |
| 4,435,666 | 3/1984 | Fukui et al. | 310/328 |
| 4,518,887 | 5/1985 | Yano et al. | 310/328 |
| 4,547,086 | 10/1985 | Matsumoto et al. | 310/328 |
| 4,570,095 | 2/1986 | Uchikawa | 310/328 |
| 4,589,786 | 5/1986 | Fukui et al. | 310/328 |
| 4,874,978 | 10/1989 | Sakaida et al. | 310/328 |

FOREIGN PATENT DOCUMENTS

| 57-187980 | 11/1982 | Japan . |
| 1110160 | 4/1989 | Japan . |
| 170543 | 5/1989 | Japan . |

Primary Examiner—Mark O. Budd
Attorney, Agent, or Firm—Oliff & Berridge

[57] ABSTRACT

A device for magnifying displacement of an elongated piezoelectric element adapted to be displaced by application of voltage thereto, including a main frame extending along one side of the piezoelectric element and having a lateral projection for supporting one end of the piezoelectric element with respect to a direction of displacement of the piezoelectric element; a movable member mounted on the other end of the piezoelectric element with respect to the direction of displacement of the piezoelectric element; a first leaf spring fixed at its one end portion to the main frame; a second leaf spring fixed at its one portion to the movable member and disposed in opposed relationship to the first leaf spring; a rocking member fixedly connected to the other end of the first leaf spring and the other end of the second leaf spring and adapted to be rocked by flexing of the first and second leaf springs to be generated by the displacement of the piezoelectric element; a sub frame extending along the other side of the piezoelectric element opposite to the main frame to a position opposed to the movable member and fixedly connected at its one end to the lateral projection of the main frame; and a quadrihinged parallel link mechanism fixed to the movable member and the other end of the sub frame, so as to displace the movable member in parallel to the direction of displacement of the piezoelectric element.

29 Claims, 26 Drawing Sheets

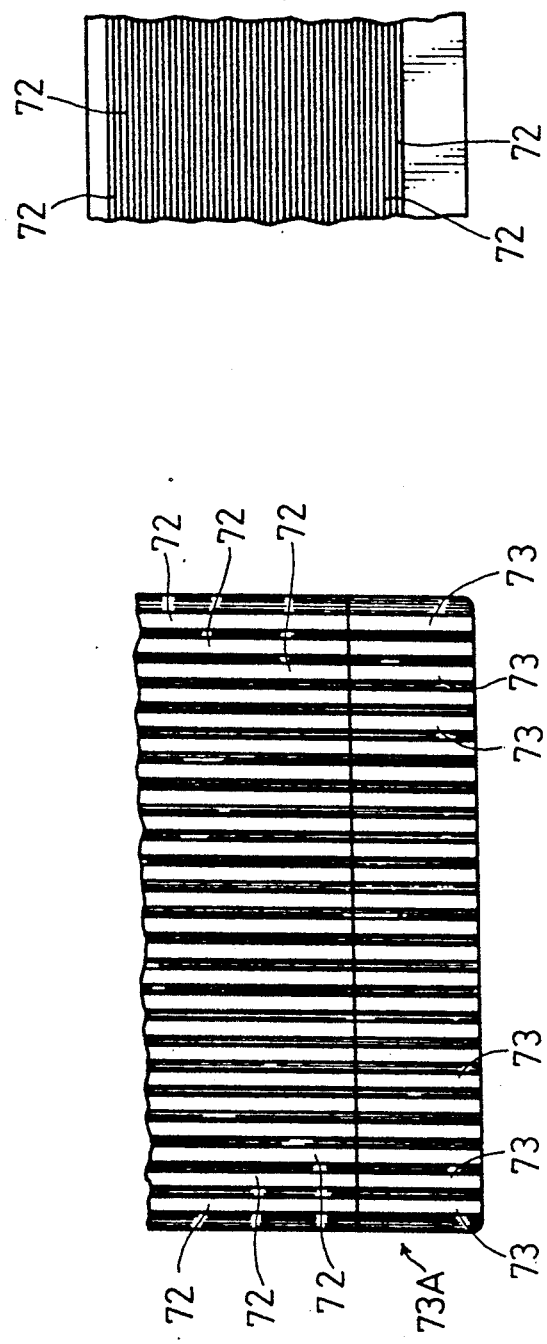
FIG.35
FIG.34
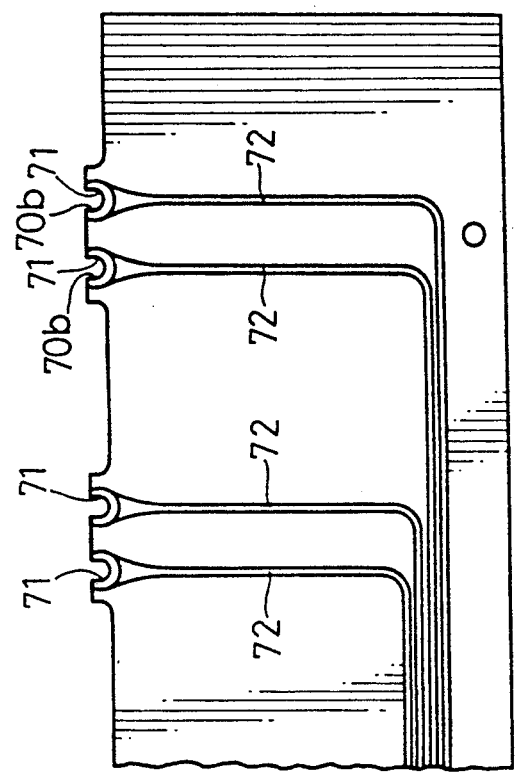
FIG.36

DEVICE FOR MAGNIFYING DISPLACEMENT OF PIEZOELECTRIC ELEMENT AND METHOD OF PRODUCING SAME

BACKGROUND OF THE INVENTION

The present invention relates to a device for magnifying displacement of a piezoelectric element and a method of producing same, particularly for use with a printing head. The present invention also relates to a printing head including such a displacement magnifying device.

FIG. 37 shows a prior art device for magnifying displacement of a piezoelectric element 101. Referring to FIG. 37, a movable member 105 is attached to the piezoelectric element 101. On the other hand, a pair of leaf springs 106 and 107 are fixed at their respective one end portions to a frame 102 and the movable member 105, and a rocking block 108 is fixed to the other end portions of the leaf springs 106 and 107. When the piezoelectric element 101 is expanded upon application of voltage thereto, the movable member 105 is displaced to flex the leaf springs 106 and 107. As a result, there is generated a moment in the rocking block 108 to rock the same. Further, an elastically deformable connecting member 104 is fixed between the movable member 105 and a lateral projection 103 of the frame 102, so as to displace the movable member 105 in parallel to a direction of displacement of the piezoelectric element 101. However, it is hard to balance a spring force of the connecting member 104 to a spring force of the leaf springs 106 and 107, causing inclination of the movable member 105 relative to the direction of displacement of the piezoelectric element 101. As a result, an amount of flexing of the leaf springs 106 and 107 is fluctuated, and the rocking block 108 cannot be rocked at a desired rocking angle.

Such a problem has been intentionally eliminated by providing a quadri-hinged parallel link mechanism consisting of a pair of separate link plates 117 as shown in FIG. 37. Each of the link plates 117 is integrally formed with a pair of vertical link portions 118 and 119 and a pair of horizontal link portions 120 and 121. The vertical link portions 118 of the pair of link plates 117 are fixed to opposite side surfaces of the frame 102, and the vertical link portions 119 are fixed to opposite side surfaces of the movable member 105, so as to ensure parallel displacement of the movable member 105.

The leaf springs 106 and 107 are fixed by brazing to opposed surfaces of the frame 102 and the movable member 105. To improve the fixation of the leaf springs 106 and 107 to the frame 102 and the movable member 105, the leaf springs 106 and 107 are so disposed as to project laterally from the opposite side surfaces of the frame 102 and the movable member 105. Accordingly, when the link plates 117 are fixed to the opposite side surfaces of the frame 102 and the opposite side surfaces of the movable member 105, the horizontal link portions 120 and 121 of the link plates 117 interfere with the side projections of the leaf springs 106 and 107. To eliminate the interference, it is necessary to cut the side projections of the leaf springs 106 and 107 (as shown by a hatched portion). However, cutting of the hatched portion of the leaf springs 106 and 107 is difficult and requires much time and labor. Further, such cutting causes a reduction of the strength of fixation of the leaf springs 106 and 107.

FIG. 38 shows another example of the prior art device. When the application of voltage to the piezoelectric element 101 is cut to contract the piezoelectric element 101 to its original condition, the leaf springs 106 and 107 and a rocking arm 110 fixed at its one end to the rocking block 108 are returned to the original condition. At this time, the rocking arm 110 tends to be retracted more than the rest position by the inertia, and the leaf springs 106 and 107 are oscillated as shown by arrows P and Q by the elastic force thereof until stopped at the rest position. Accordingly, a time required for stopping the leaf springs 106 and 107 becomes long to hinder a high-speed rocking motion of the rocking arm 110 in response to the displacement of the piezoelectric element 101. Further, there is generated elastic fatigue of the leaf springs 106 and 107 due to the above-mentioned oscillation which reduces the durability of the leaf springs 106 and 107. To solve this problem, a stopper 135 is fixedly provided on an upper end of the connecting member 104 in opposed relationship to a lower longitudinal edge of the rocking arm 110. However, as the stopper 135 abuts against a substantially longitudinally central portion of the rocking arm 110, a free end portion of the rocking arm 110 tends to be flexed as shown by a chain line. Simultaneously, there is generated a moment in the rocking arm 110 about the stopper 135 to cause the oscillation of the leaf springs 106 and 107 in the directions of the arrows P and Q and the oscillation of the rocking arm 110 in the directions of arrows A and B.

Further, when the movable member 105 is returned to the original condition, the return motion tends to be delayed because of the inertia of the movable member 105, the leaf springs 106 and 107 and the rocking block 108. As the movable member 105 is fixed to the upper end surface of the piezoelectric element 101, a tensile force is applied to the piezoelectric element 101 because of such a delay. The piezoelectric element 101 is normally formed of piezoelectric ceramic having a weak property against the tensile force. Therefore, the piezoelectric element 101 tends to be damaged by the tensile force.

Referring back to FIG. 37, a pair of wedge members 141 and 142 are interposed under pressure between the lower end surface of the piezoelectric element 101 and the lateral projection 103, so as to apply a compression load to the piezoelectric element 101 and thereby ensure sufficient transmission of the displacement of the piezoelectric element 101 to the movable member 105. The upper wedge member 141 is fixed by adhesive to the lower end surface of the piezoelectric element 101, and the lower wedge member 142 is forced into a space between the upper wedge member 141 and the lateral projection 103, thus applying the compression load to the piezoelectric element 101. However, contact surfaces 141a and 142a of the wedge members 141 and 142 are required to be machined with a high accuracy, so as to ensure uniform application of the compression load to the piezoelectric element 101. Further, the number of parts is increased, and the assembling is rendered troublesome to cause an increase in cost.

FIGS. 39 and 40 show a prior art printing head. A plurality of printing units 201 (one of which is shown for simplicity) are inserted in a plurality of slits 203 formed in a substantially cylindrical holder 202 and arranged at circumferentially equal intervals. A flexible printed wiring board 206 having a plurality of connection terminals to be connected by soldering or the like to lead wires 205L of piezoelectric elements 205 of the printing units 201 is mounted on end surfaces of frames 204 of the printing units 201 on the side opposite to the holder 202. A cover plate 208 having a nose 107 for reciprocably guiding a plurality of printing wires connected to the corresponding printing units 201 is fitted with the holder 202.

In the event that any one of the printing units 201 is required to be exchanged because of breakage or wear of the corresponding printing wire, it is necessary to disconnect the lead wires of all the printing units 201 from the connection terminals of the flexible printed wiring board 206, and then remove all the printing units 201 from the slits 203 of the holder 202. Thus, the exchange of the printing unit 201 is very troublesome.

SUMMARY OF THE INVENTION

It is a first object of the present invention to provide a device for magnifying displacement of a piezoelectric element and a method of producing same which may eliminate the necessity of cutting the opposite projections of the leaf springs projecting from the opposite side surfaces of the main frame and the movable member.

It is a second object of the present invention to provide a device for magnifying displacement of a piezoelectric element and a method of producing same which may ensure stable displacement of the movable member in parallel to the direction of displacement of the piezoelectric element.

According to a first aspect of the present invention, there is provided a device for magnifying displacement of an elongated piezoelectric element adapted to be displaced by application of voltage thereto, comprising a main frame extending along one side of said piezoelectric element and having a lateral projection for supporting one end of said piezoelectric element with respect to a direction of displacement of said piezoelectric element; a movable member mounted on the other end of said piezoelectric element with respect to the direction of displacement of said piezoelectric element; a first leaf spring fixed at its one end portion to said main frame; a second leaf spring fixed at its one portion to said movable member and disposed in opposed relationship to said first leaf spring; a rocking member fixedly connected to the other end of said first leaf spring and the other end of said second leaf spring and adapted to be rocked by flexing of said first and second leaf springs to be generated by the displacement of said piezoelectric element; a sub frame extending along the other side of said piezoelectric element opposite to said main frame to a position opposed to said movable member and fixedly connected at its one end to said lateral projection of said main frame; and a quadri-hinged parallel link mechanism fixed to said movable member and the other end of said sub frame, so as to displace said movable member in parallel to the direction of displacement of said piezoelectric element.

As mentioned above, the quadri-hinged parallel link mechanism is fixed between an end portion of the sub frame and the movable member opposed to the end portion. Therefore, interference between the leaf springs and the quadri-hinged parallel link mechanism can be avoided. Further, the movable member can be displaced stably in parallel to the direction of displacement of the piezoelectric element by the provision of the quadri-hinged parallel link mechanism.

According to a second aspect of the present invention, there is provided a method of producing a device for magnifying displacement of an elongated piezoelectric element adapted to be displaced by application of voltage thereto, comprising a first step of forming an integral frame body having a main frame extending along one side of said piezoelectric element, a supporting portion for supporting one end of said piezoelectric element with respect to a direction of displacement of said piezoelectric element, a movable member mounted on the other end of said piezoelectric element with respect to the direction of displacement of said piezoelectric element, and a sub frame extending along the other side of said piezoelectric element opposite to said main frame; a second step of fixing a pair of leaf springs connected at one end with a rocking member to said main frame and said movable member; a third step of forming a first parting slit between said main frame and said movable member and a second parting slit between said movable member and said sub frame to separate said main frame, said movable member and said sub frame; a fourth step of fixing a quadri-hinged parallel link mechanism between said movable member and said sub frame; and a fifth step of fixing said piezoelectric element between said supporting portion and said movable member.

As mentioned above, the main frame, the movable member and the sub frame are separated by forming the first and second parting slits in the integral frame body. Therefore, the formation of these members can be simplified more than a method of independently forming these members and then mounting them together. Further, the accuracy of arrangement of these members can be made high.

It is a third object of the present invention to provide a device for magnifying displacement of a piezoelectric element and a method of producing same which may reduce the oscillation of the rocking arm and the leaf springs upon cutting of application of voltage to the piezoelectric element to thereby increase a rocking speed of the rocking arm and improve the durability of the rocking arm and the leaf springs.

According to a third aspect of the present invention, there is provided a device for magnifying displacement of an elongated piezoelectric element adapted to be displaced by application of voltage thereto, comprising a main frame extending along one side of said piezoelectric element and having a lateral projection for supporting one end of said piezoelectric element with respect to a direction of displacement of said piezoelectric element; a movable member mounted on the other end of said piezoelectric element with respect to the direction of displacement of said piezoelectric element; a first leaf spring fixed at its one end portion to said main frame; a second leaf spring fixed at its one end portion to said movable member and disposed in opposed relationship to said first leaf spring; a rocking arm connected at its one end with the other ends of said first and second leaf springs and extending in a direction substantially perpendicular to the direction of displacement of said piezoelectric element, said rocking arm being rockable by flexing said first and second leaf springs; a first stopper member for restricting flexing of said rocking arm upon cutting of the application of voltage to said piezoelectric element; and a second stopper member for restricting flexing of said second leaf spring upon cutting of the application of voltage to said piezoelectric element.

When the piezoelectric element is expanded by applying voltage thereto, the movable member is displaced by the expansion of the piezoelectric element. Accordingly, the second leaf spring fixed to the movable member is flexed by the displacement of the movable member to follow flexing of the first leaf spring fixed to the main frame. Thus, both the first and second leaf springs are flexed to generate a moment at the base end of the rocking arm fixed to the first and second leaf springs, thereby rocking the rocking arm.

When the application of the voltage to the piezoelectric element is cut, the piezoelectric element is contracted to its original condition. As a result, the first and second leaf springs are returned to their original condition by their resilient forces to generate a reverse moment and return the rocking arm to its original condition.

At this time, the flexing of the second leaf spring to the side of the movable member is restricted by the stopper surface of the second stopper member, so that the oscillation of the first and second leaf springs may be reduced. Furthermore, the rocking arm is brought into abutment against the stopper surface of the first stopper member, so that excess return rocking of the rocking arm may be suppressed.

It is a fourth object of the present invention to provide a device for magnifying displacement of a piezoelectric element and a method of producing same which may reduce a tensile force to be applied to the piezoelectric element due to the delay of the return movement of the movable member in the contraction of the piezoelectric element and thereby prevent damage of the piezoelectric element.

According to a fourth aspect of the present invention, there is provided a device for magnifying displacement of an elongated piezoelectric element adapted to be displaced by application of voltage thereto, comprising a main frame extending along one side of said piezoelectric element and having a lateral projection for supporting one end of said piezoelectric element with respect to a direction of displacement of said piezoelectric element; a movable member mounted on the other end of said piezoelectric element with respect to the direction of displacement of said piezoelectric element; means connected to said movable member and said main frame for magnifying the displacement of said piezoelectric element; and a separatable portion provided at least one of opposed surfaces between said movable member and said piezoelectric element and between said piezoelectric element and said lateral projection of said main frame.

When the application of voltage to the piezoelectric element is cut, the piezoelectric element is contracted to the original condition, and the movable member is also returned to the original condition. At this time, the return of the movable member is delayed because of inertia thereof. However, as there is provided the separatable portion at least one of the opposed surfaces between the movable member and the piezoelectric element and between the piezoelectric element and the lateral projection of the main frame, at least one of the opposed surfaces can be separated upon contraction of the piezoelectric element. Therefore, the tensile force to be applied to the piezoelectric element can be greatly reduced.

It is a fifth object of the present invention to provide a device for magnifying displacement of a piezoelectric element and a method of producing same which may apply a given compression load to the piezoelectric element with the number of parts reduced and displace the movable member in parallel to the direction of displacement of the piezoelectric element.

According to a fifth aspect of the present invention, there is provided a device for magnifying displacement of an elongated piezoelectric element adapted to be displaced by application of voltage thereto, comprising a main frame extending along one side of said piezoelectric element and having a lateral projection for supporting one end of said piezoelectric element with respect to a direction of displacement of said piezoelectric element; a movable member mounted on the other end of said piezoelectric element with respect to the direction of displacement of said piezoelectric element; means connected to said movable member and said main frame for magnifying the displacement of said piezoelectric element; a sub frame extending along the other side of said piezoelectric element opposed to said main frame to a position opposed to said movable member and fixedly connected at its one end to said lateral projection of said main frame; and a quadri-hinged parallel link mechanism fixed to said movable member and the other end of said sub frame, so as to displace said movable member in parallel to the direction of displacement of said piezoelectric element; wherein said movable member is pressed on the other end of said piezoelectric element by an elastic force of said quadri-hinged parallel link mechanism to apply a given compression load to said piezoelectric element.

With this construction, the movable member can be displaced in parallel to the direction of displacement of the piezoelectric element owing to the quadri-hinged parallel link mechanism. Further, as a given compression load is applied to the piezoelectric element by the elastic force of the hinge portions of the quadri-hinged parallel link mechanism, a dedicated preload member for applying the given compression load to the piezoelectric element is not needed.

It is a sixth object of the present invention to provide an impact dot printing head of a type to be driven by a piezoelectric element adapted to be displaced by application of voltage thereto, which may enable any one of plural printing units to be replaced easily.

According to a sixth aspect of the present invention, there is provided an impact dot printing head of a type to be driven by a piezoelectric element adapted to be displaced by application of voltage thereto, comprising a plurality of printing units each having a printing wire for printing dots onto a printing medium and a displacement transmitting mechanism for transmitting displacement of said piezoelectric element to said printing wire; a holder for holding said printing units, said holder being formed at its inner circumference with a plurality of slits each for releaseably inserting each of said printing units; a cover plate adapted to be engaged with said holder and having means for releaseably fixing each of said printing units, said cover plate being formed with a guide portion for guiding said printing wires of said printing units; and a flexible printed wiring board partially wound around an outer circumferential surface of said holder, said flexible printed wiring board having plural pairs of connection terminals which each pair is connected to a pair of lead wires connected to said piezoelectric element, each pair of said connection terminals being arranged in the vicinity of each said printing unit and being connected through conductors to end terminals to be connected to printing control means.

With this construction, in the case that any one of the printing wires is broken to need the exchange of the corresponding printing unit, it is only necessary to remove the load wires connected to the printing unit intended to be exchanged, from the connection terminals of the flexible printed wiring board. Thus, the printing unit can be easily exchanged.

The invention will be more fully understood from the following detailed description and appended claims when taken with the drawings.

BRIEF DESCRIPTION OF THE DRAWINGS

FIG. 34 is an enlarged view of an encircled area A shown in FIG. 33;

FIG. 35 is an enlarged view of an encircled area B shown in FIG. 33;

FIG. 36 is an enlarged view of an encircled area C shown in FIG. 33;

DETAILED DESCRIPTION OF THE PREFERRED EMBODIMENTS

There will now be described some preferred embodiments of the present invention with reference to the drawings.

Figure 1:
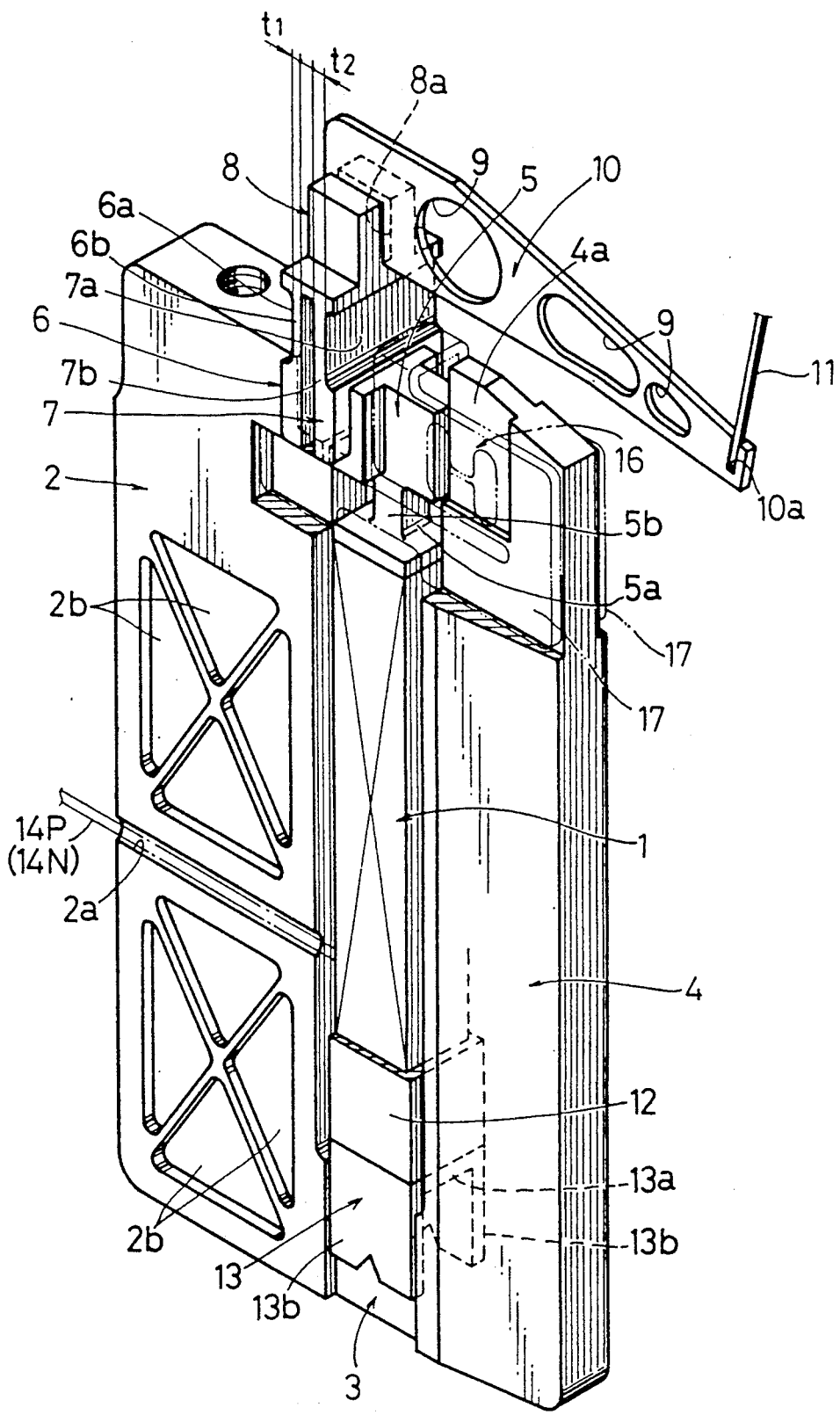
FIG. 1 is a perspective view of a first preferred embodiment of the device for magnifying displacement of a piezoelectric element according to the present invention.
Figure 2:
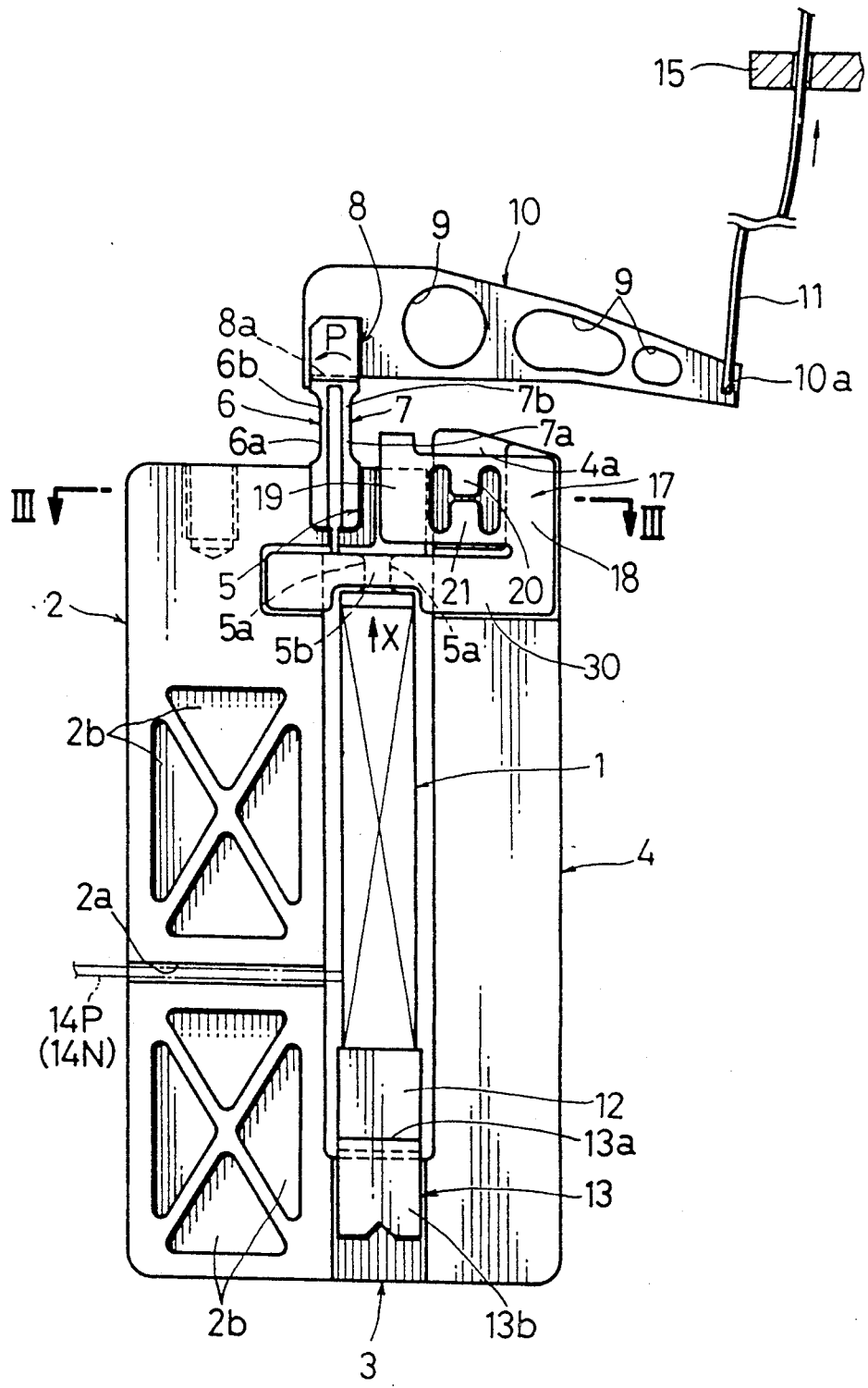
FIG. 2 is a side view of FIG. 1.

Referring first to FIGS. 1 and 2 which show a first preferred embodiment of the present invention, reference numeral 1 designates a piezoelectric element formed from a stacked piezoelectric ceramic adapted to be expanded when voltage is applied thereto.

Reference numeral 2 designates a main frame for supporting the piezoelectric element 1. The main frame 2 is formed from a rectangular metal plate having a predetermined thickness, and it is so located as to extend along the piezoelectric element 1. The main frame 2 is formed at its lower end with a lateral projection 3 for supporting a lower end of the piezoelectric element 1 through a temperature compensating member 12 and a preload member 13 (which will be hereinafter described). The main frame 2 is formed on its opposite side surfaces with a pair of guide grooves 2a for guiding a pair of lead wires 14P and 14N and with a plurality of recesses 2b for the purpose of reduction in weight.

A movable member 5 is provided on the upper end of the piezoelectric element 1 in opposed relationship to an upper portion of the main frame 2. A pair of leaf springs 6 and 7 are fixed at their lower portions by brazing to the opposed surfaces of the main frame 2 and the movable member 5, respectively. The leaf springs 6 and 7 have a width greater than the thickness of the main frame 2 and the movable member 5. That is, the leaf springs 6 and 7 project laterally outwardly from the opposite side surfaces of the main frame 2 and the movable member 5. Under the condition, the leaf springs 6 and 7 are brazed to the main frame 2 and the movable member 5, thereby enhancing fixation of the leaf springs 6 and 7 to the main frame 2 and the movable member 5. The leaf springs 6 and 7 are spaced by a predetermined gap, and extend upwardly from the upper end surface of the main frame 2 and the movable member 5. The leaf springs 6 and 7 are connected together at their upper ends to form a rocking block 8. The upper portions of the leaf springs 6 and 7 projecting from the upper end surfaces of the main frame 2 and the movable member 5 are formed on their outside surfaces with a pair of recesses 6a and 7a, thereby forming a pair of thin-walled portions 6b and 7b as an elastically deformable portion. The thin-walled portion 7b has a thickness t2 greater than a thickness t1 of the thin-walled portion 6b, so as to increase an elastic strength of the leaf spring 7 fixed to the movable member 5. Accordingly, buckling and breaking of the leaf spring 7 are positively prevented to improve the durability.

The rocking block 8 is formed with a groove 8a extending in a direction perpendicular to the width of the leaf springs 6 and 7. A rocking arm 10 is inserted at its base portion in the groove 8a, and is fixed by brazing. The rocking arm 10 is formed at its free end with a groove 10a. A printing wire 11 is inserted at its base end in the groove 10a, and is fixed by brazing. The rocking block 8 has a width smaller than the width of the leaf springs 6 and 7, so as to reduce the weight. Further, the rocking arm 10 is formed with a plurality of through-holes 9, so as to reduce the weight.

The lateral projection 3 of the main frame 2 is integrally formed with a sub frame 4. The sub frame 4 extends upwardly from the lateral projection 3 along the piezoelectric element 1 (on the side opposite to the main frame 2) to a position opposed to the movable member 5.

Figure 4:
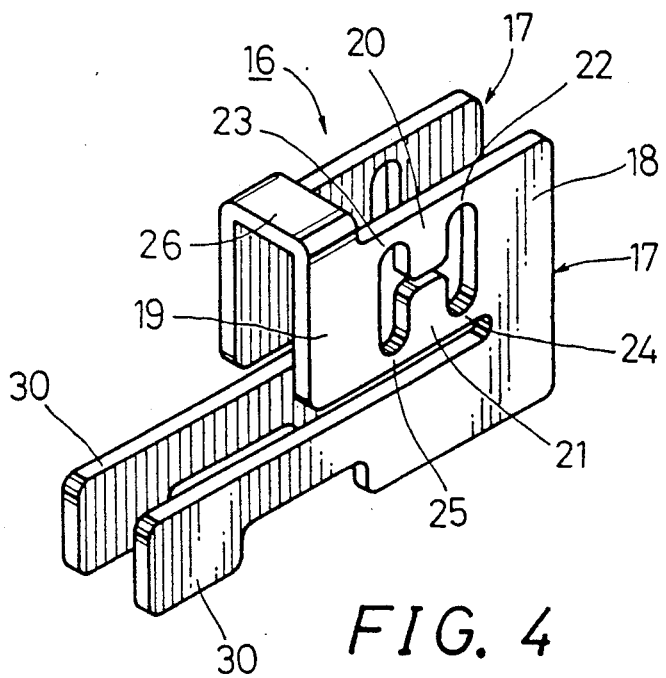
FIG. 4 is a perspective view of a quadri-hinged parallel link mechanism shown in FIG. 1.

A quadri-hinged parallel link mechanism 16 is provided between an upper end portion of the sub frame 4 and the movable member 5, so as to guide the movable member 5 in a direction parallel to the expanding direction of the piezoelectric element 1. As shown in FIG. 4, the quadri-hinged parallel link mechanism 16 is formed by punching and bending a single elastically deformable leaf spring material to form a pair of parallel link plates 17 and a bridge portion 26 bridging the parallel link plates 17.

Each of the parallel link plates 17 is composed of a pair of vertical link portions 18 and 19 extending in parallel to the expanding direction of the piezoelectric element 1, a pair of horizontal link portions 20 and 21 connected between the vertical link portions 18 and 19 through upper hinge portions 22 and 23 and lower hinge portions 24 and 25, thus forming a quadri-hinged parallel link. The vertical link portions 18 of the parallel link plates 17 are fixed by spot welding or the like to opposite side surfaces of the sub frame 4 at its upper end portion, and the vertical link portions 19 of the parallel link plates 17 are fixed by spot welding or the like to opposite side surfaces of the movable member 5. The vertical link portions 19 are connected at their upper ends by the bridge portion 26. The bridge portion 26 is located at a predetermined distance from the upper end surface of the movable member 5.

As shown in FIG. 4, a pair of parallel connecting plates 30 are integrally connected with the lower ends of the vertical link portions 18 of the parallel link plates 17. Under the mounted condition as shown in FIG. 2, the connecting plates 30 horizontally extend from the opposite side surfaces of the sub frame 4 through the opposite side surfaces of the movable member 5 to the opposite side surfaces of the main frame 2. The connecting plates 30 are fixed by spot welding or the like to the opposite side surfaces of the sub frame 4 and the opposite side surfaces of the main frame 2. Accordingly, the sub frame 4 is maintained in parallel relationship to the main frame 2, and the rigidity of both the frames 2 and 4 can be increased.

Figure 3:
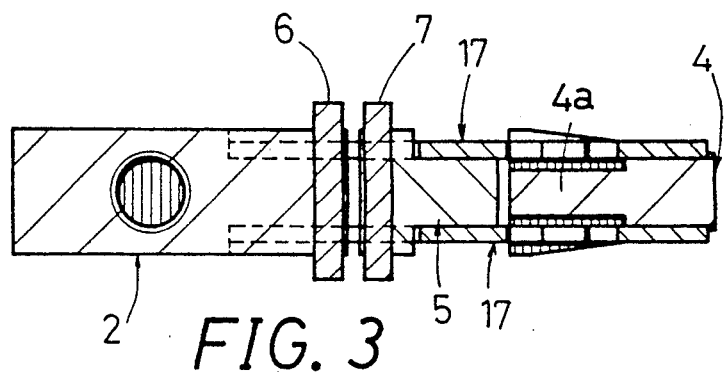
FIG. 3 is a cross-section taken along the line III—III in FIG. 2.

The thicknesses of the mounting portions of the main frame 2, the sub frame 4 and the movable member 5 where the link plates 17 and the connecting plates 30 are mounted are reduced by an amount corresponding to the thickness of the plates 17 and 30. Accordingly, the plates 17 and 30 can be mounted within the thicknesses of the main frame 2, the sub frame 4 and the movable member 5, thus contributing to the compactness of the device. Further, as shown in FIG. 3, the thickness of the sub frame 4 at a portion 4a where the horizontal link portions 20 and 21 and the hinge portions 22 to 25 are disposed is reduced so as to prevent these portions 20, 21, 20 to 25 from contacting the opposite side surfaces of the thin-walled portion 4a of the sub frame 4.

After fixing the link plates 17 and the connecting plates 30 to the sub frame 4, the movable member 5 and the main frame 2, the piezoelectric element 1 and the temperature compensating member 12 are mounted between the lateral projection 3 of the main frame 2 and the movable member 5 under the preloaded condition provided by interposing the preload member 13 between the temperature compensating member 12 and the lateral projection 3. The preload member 13 has an inverted U-shaped configuration composed of an upper plate 13a and opposite side plates 13b. In mounting the piezoelectric element 1, the preload member 13 is first vertically movably engaged with the lateral projection 3. The temperature compensating member 12 is previously fixed by adhesive to the lower end surface of the piezoelectric element 1. Then, the lower end surface of the temperature compensating member 12 is brought into contact with the upper surface of the upper plate 13a of the preload member 13. Then, the preload member 13 is upwardly urged to apply a given compression load from the upper end surface of the piezoelectric element 1 to the lower surface of the movable member 5. Under the loaded condition, the opposite side plates 13b of the preload member 13 are fixed by spot welding to the opposite side surfaces of the lateral projection 3.

The temperature compensating member 12 is formed of a material such as zinc or aluminum material having a linear expansion characteristic contrary to that of the piezoelectric element 1. Accordingly, expansion and contraction of the piezoelectric element 1 due to a change in peripheral temperature can be compensated by contraction and expansion of the temperature compensating member 12, thereby maintaining the upper end surface of the piezoelectric element 1 at a constant level.

The contact surfaces between the movable member 5 and the piezoelectric element 1 and the contact surfaces between the temperature compensating member 12 and the preload member 13 may be fixed by adhesive.

As shown in FIG. 2, the movable member 5 is formed at its lower portion with opposite recesses 5a to form an elastic expanding/contracting portion 5b therebetween. The elastic expanding/contracting portion 5b has a rigidity greater than that of the elastic deformable portion 7b of the leaf spring 7, and is adapted to be elastically expanded and contracted by a small amount in the expanding and contracting directions of the piezoelectric element 1. A desired amount of displacement of the movable member 5 due to expansion and contraction of the piezoelectric element 1 is ensured, and when the application of voltage to the piezoelectric element 1 is cut to cause the contraction of the piezoelectric element 1, the elastic expanding/contracting portion 5b of the movable member 5 is slightly expanded by the piezoelectric element 1. Therefore, a tensile force to be applied to the piezoelectric element 1 formed of piezoelectric ceramic which is weal against the tensile force can be reduced, thereby preventing damage of the piezoelectric element 1.

In operation, when voltage is applied between both the electrodes of the piezoelectric element 1, the piezoelectric element 1 is expanded by a given length in the direction of stack of the piezoelectric ceramic, that is, in the direction of an arrow X in FIG. 2. As a result, the movable member 5 is displaced, and the leaf spring 7 is urged upwardly along the leaf spring 6 on the main frame 2 side. Accordingly, both the leaf springs 6 and 7 are flexed. Since the leaf spring 6 is flexed more easily than the leaf spring 7, the rocking block 8 integrally formed with the leaf springs 6 and 7 is rocked in a direction depicted by an arrow P in FIG. 2.

In the course of displacement of the movable member 5 caused by the expansion of the piezoelectric element 1, the movable member 5 is guided in parallel to the expanding direction of the piezoelectric element 1 by the link plates 17 of the quadri-hinged parallel link mechanism 16. Therefore, shortage of the amount of flexing of the leaf springs 6 and 7 due to inclination of the movable member 5 can be prevented, thereby rocking the rocking block 8 and the rocking arm 10 to a desired rocking angular position. As a result, the printing wire 11 fixed at the free end of the rocking arm 10 is desirably advanced to a printing medium such as a printing paper (not shown) as being guided by a suitable number of guide members 15 (only one guide member 15 is shown in FIG. 2). Thus, as the leaf spring 7 fixed to the movable member 5 is flexed sufficiently and more largely than the leaf spring 6 fixed to the main frame 2, the rocking arm 10 can be reliably rocked to a desired angular position. Therefore, the expansion of the piezoelectric element 1 is greatly magnified to be transmitted to the printing wire 11, thereby improving the printing quality.

When the application of voltage to the piezoelectric element 1 is cut, the piezoelectric element 1 is contracted to the original condition. As a result, all of the movable member 5, the leaf springs 6 and 7, the rocking block 8 and the rocking arm 10 are returned to their original condition to thereby retract the printing wire 11.

With the above-mentioned construction of the preferred embodiment, it is possible to avoid interference between the link plates 17 and the leaf springs 6 and 7 since the link plates 17 are located between the movable member 5 and the sub frame 4. Therefore, it is unnecessary to cut the opposite projecting portions of the leaf springs 6 and 7 projecting from the side surfaces of the main frame 2 and the movable member 5.

There will now be described a method of producing the device for magnifying displacement of the piezoelectric element with reference to FIGS. 5 to 8.

Figure 5:
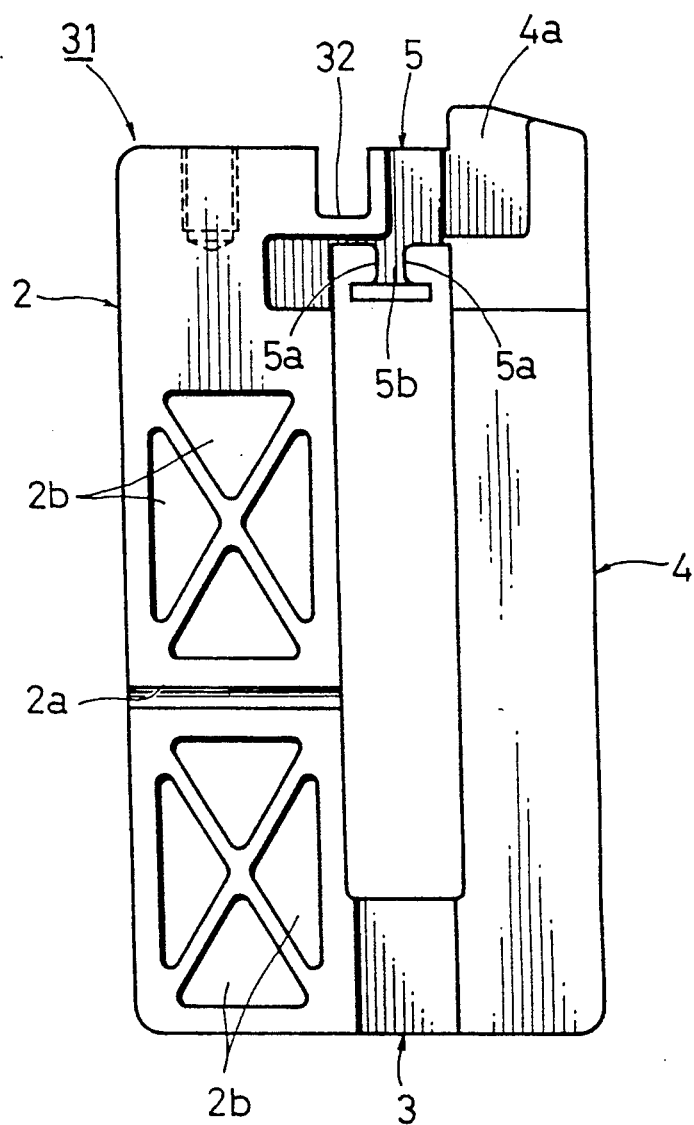
FIG. 5 is a side view of a frame body to be employed in manufacturing the device shown in FIG. 1.

Referring to FIG. 5, a frame body 31 is first formed by injection-molding a mixture of metal powder such as invar alloy or super invar alloy and thermoplastic resin as a binder, heating the molding obtained above at a predetermined temperature (100–300° C.) to remove a large part of the binder, and sintering the molding in an atmospheric gas at a predetermined temperature of about 80% of a melting point of the metal molding.

The frame body 31 as manufactured above is integrally formed with the main frame 2, the lateral projection 3, the movable member 5 and the sub frame 4. In the above injection-molding and sintering process, a recess 32 for inserting the leaf springs 6 and 7 is formed. Further, the guide channels 2a for guiding the lead wires to be connected to the piezoelectric element 1 and the recesses 2b for reducing the weight of the main frame 2 are also formed. Further, the mounting portions of the main frame 2, the sub frame 4 and the movable member 5 for mounting the link plates 17 and the connecting plates 30 are reduced in thickness corresponding to the thickness of the plates 17 and 30. Further, the thin-walled portion 4a is formed at an upper end portion of the sub frame 4 where the hinge portions 22 to 25 and the parallel horizontal portions 20 and 21 are disposed. After the sintering process, the inner surface of the recess 32 and the lower surface of the movable member 5 are finished by machining as required.

On the other hand, an integral piece of the leaf springs 6 and 7 and the rocking block 8 is formed by cutting a metal spring material having a predetermined thickness. The rocking arm 10 is also similarly formed by machining. Then, the rocking arm 10 is inserted into the slit 8a formed in the rocking block 8, and is fixed by brazing thereto. Similarly, the printing wire 11 is inserted into the recess 10a of the rocking arm 10, and is fixed by brazing thereto.

Figure 6:
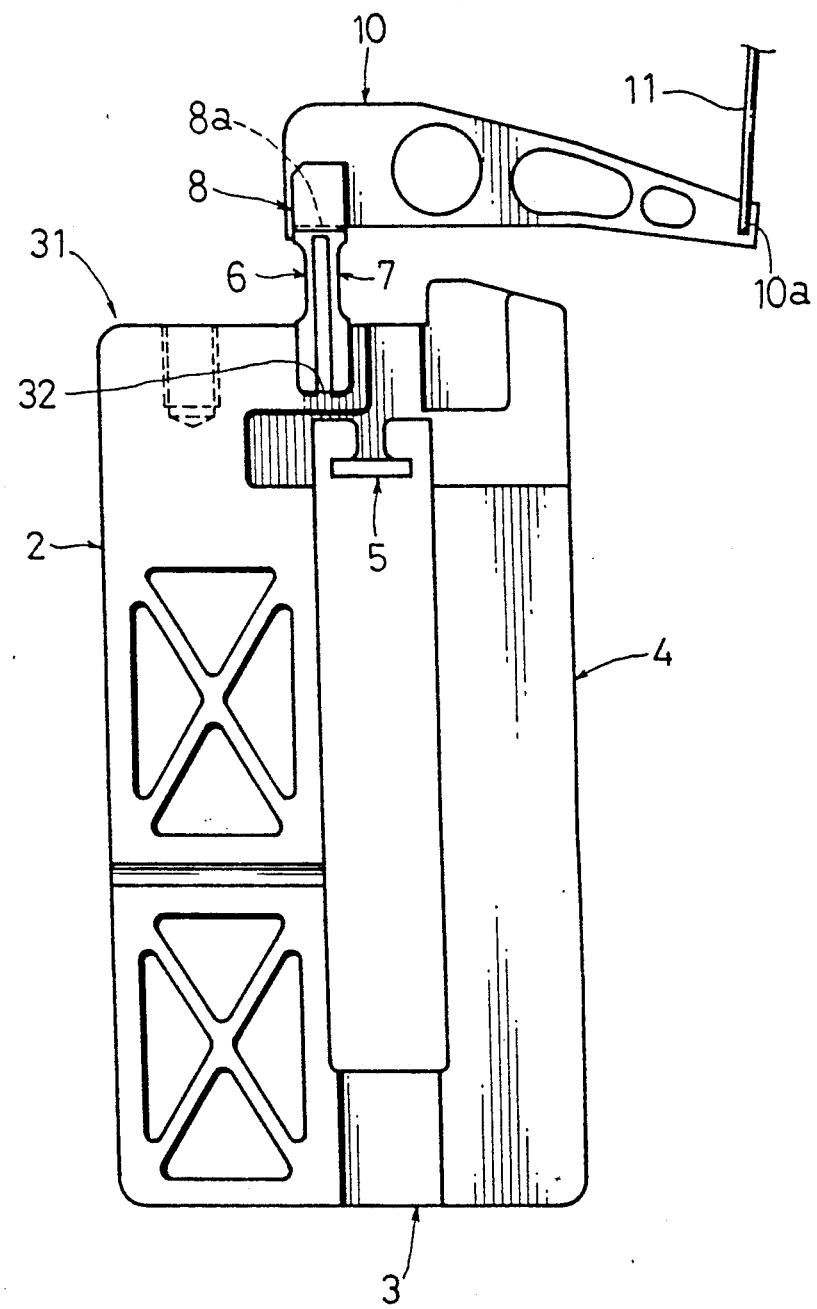
FIG. 6 is a side view of the assembly of the leaf springs with the frame body.

After assembling the leaf springs 6 and 7, the rocking arm 10 and the printing wire 11 as mentioned above, the leaf springs 6 and 7 are inserted into the recess 32, and are fixed by brazing to the inner surface of the recess 32 as shown in FIG. 6.

Figure 7:
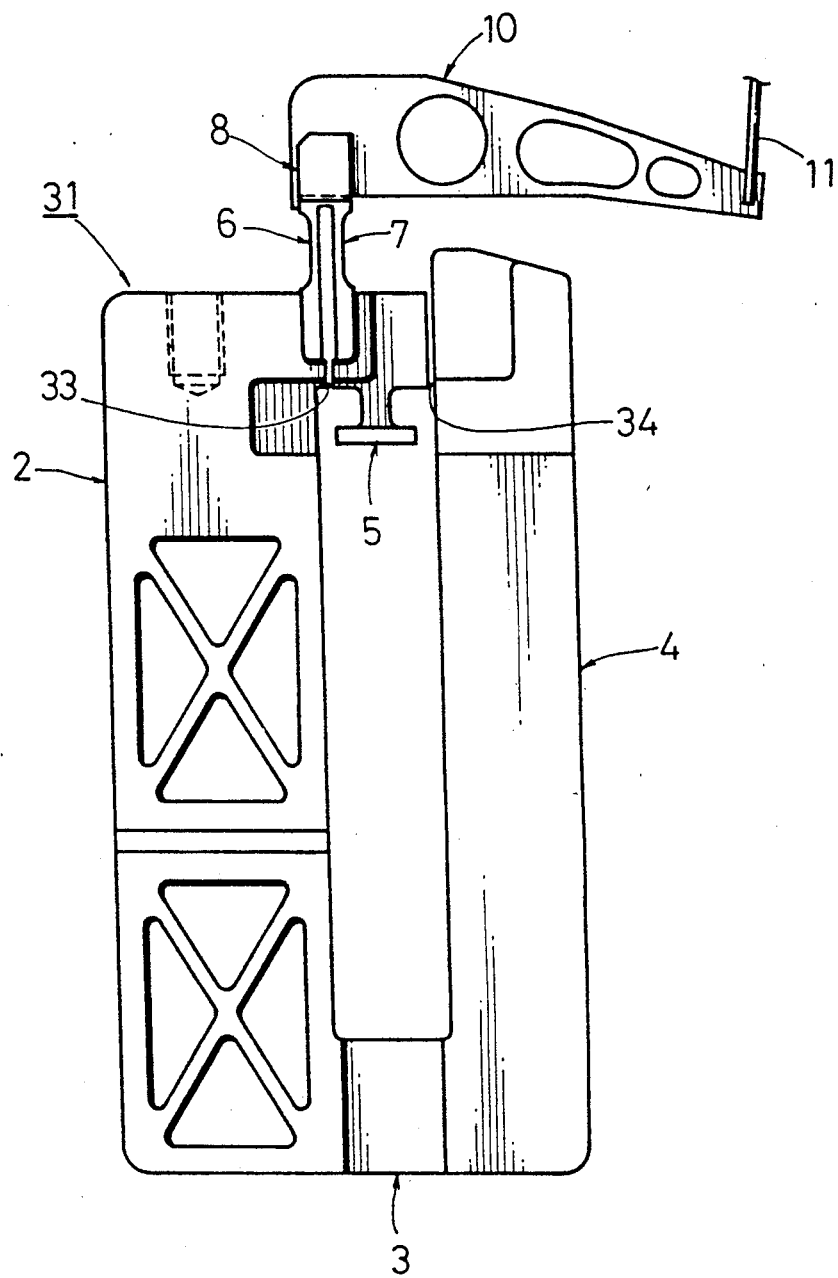
FIG. 7 is a view similar to FIG. 6, illustrating parting slits for separating the main frame, the movable member and the sub frame from each other.

Then, as shown in FIG. 7, a parting slit 33 is formed between the main frame 2 and the movable member 5, and a parting slit 34 is formed between the movable member 5 and the sub frame 4. These parting slits 33 and 34 are formed by laser cutting, wire cutting or discharge cutting. Thus, the main frame 2, the movable member 5 and the sub frame 4 are separated from one another. It is preferable to apply a silicone rubber or the like as a protection layer onto the outer surface of the leaf springs 6 and 7 before forming the parting slit 33, in order to prevent that a splash (molten chip) generated in forming the parting slit 33 by the wire cutting, the laser cutting or the like will be scattered to collide with the leaf springs 6 and 7 and injure the same which will cause promotion of fatigue of the leaf springs 6 and 7. In another aspect, the application of the silicone rubber or the like to the leaf springs 6 and 7 contributes to inhibit the generation of rust because the spring material (e.g., maraging steel) for the leaf springs 6 and 7 tends to be corrosive. The material to be applied to the leaf springs 6 and 7 such as silicone rubber preferably has a softness such that the flexing of the leaf springs 6 and 7 is not hindered, and also has a cohesive property such that the material does not flow in itself.

Figure 8:
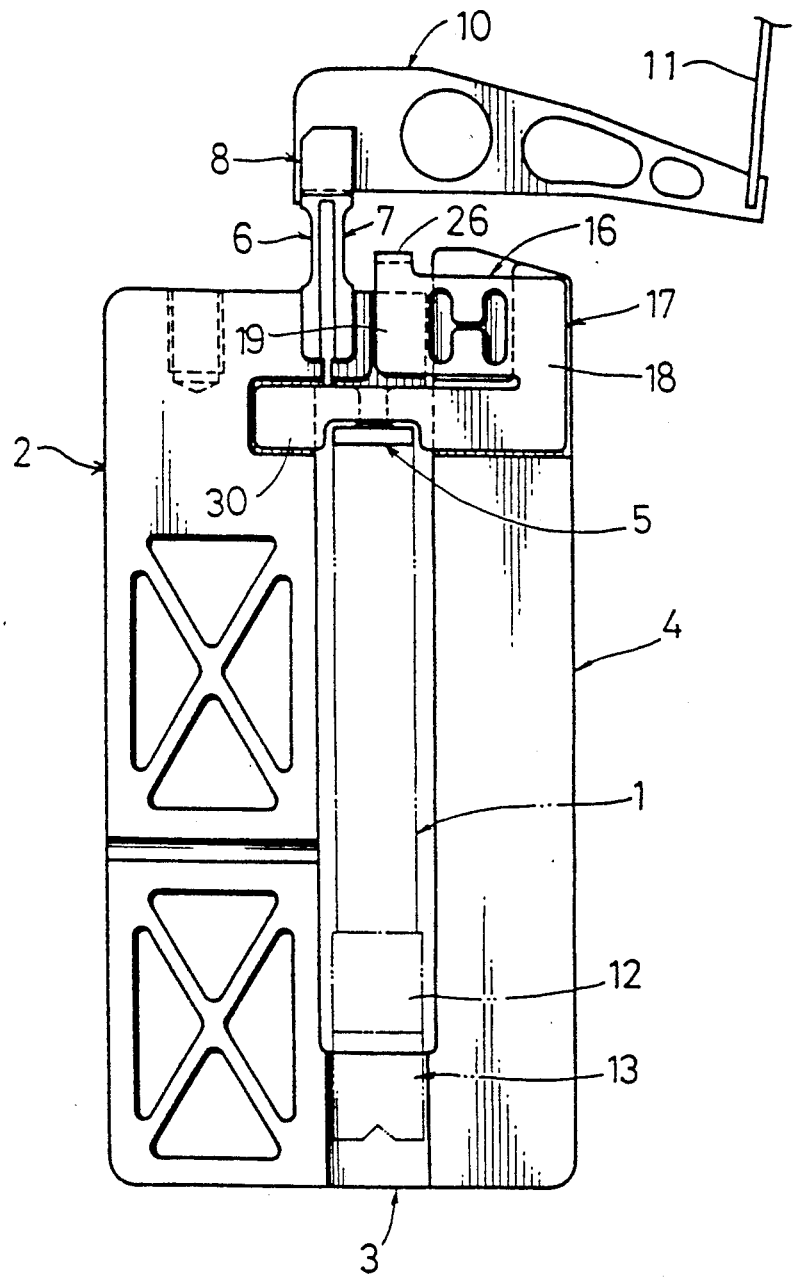
FIG. 8 is a side view illustrating the condition where the quadri-hinged parallel link mechanism is fixed to the movable member and the sub frame.
Figure 9:
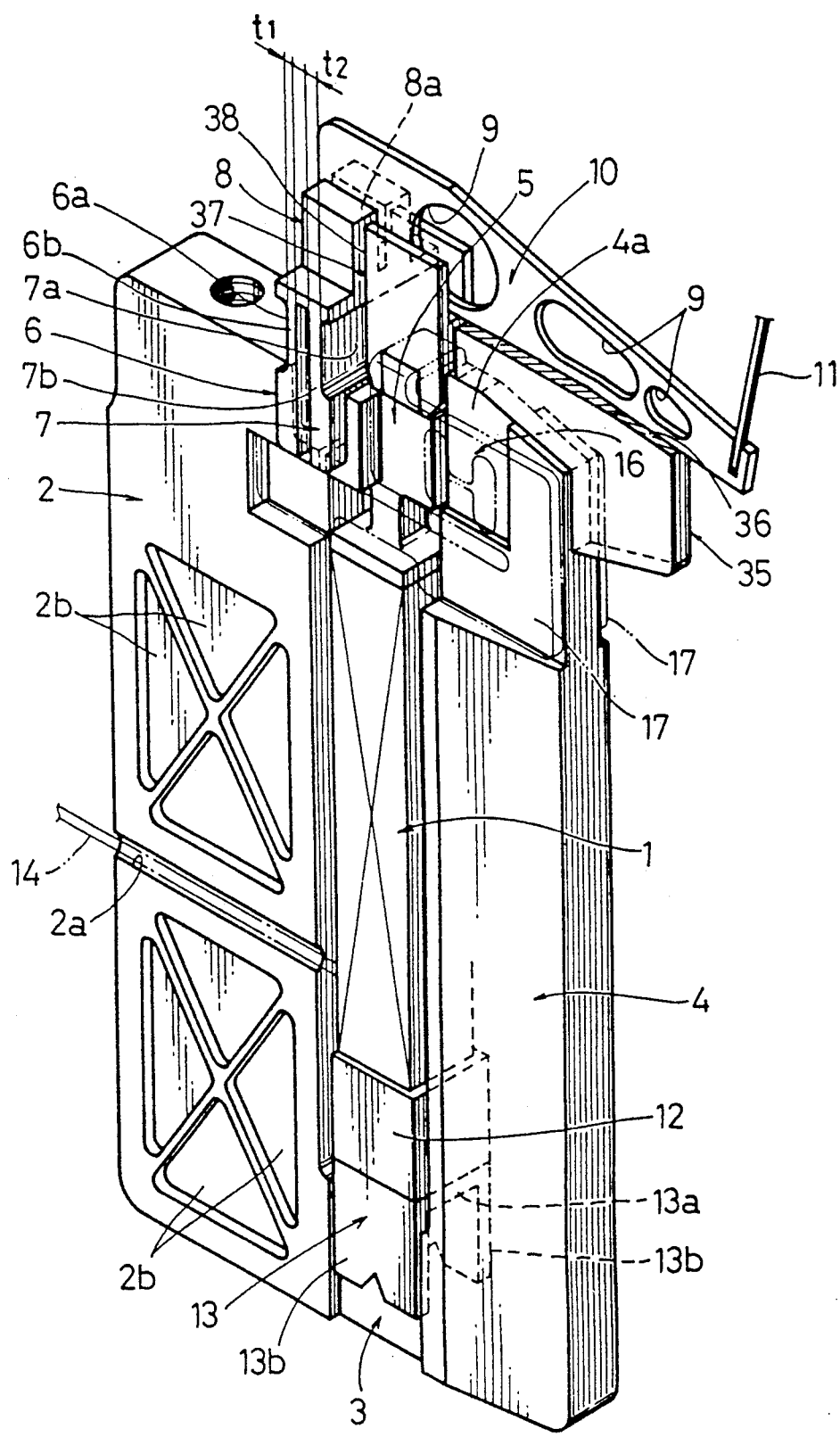
FIG. 9 is a perspective view of a second preferred embodiment of the device for magnifying displacement of a piezoelectric element according to the present invention.
Figure 10:
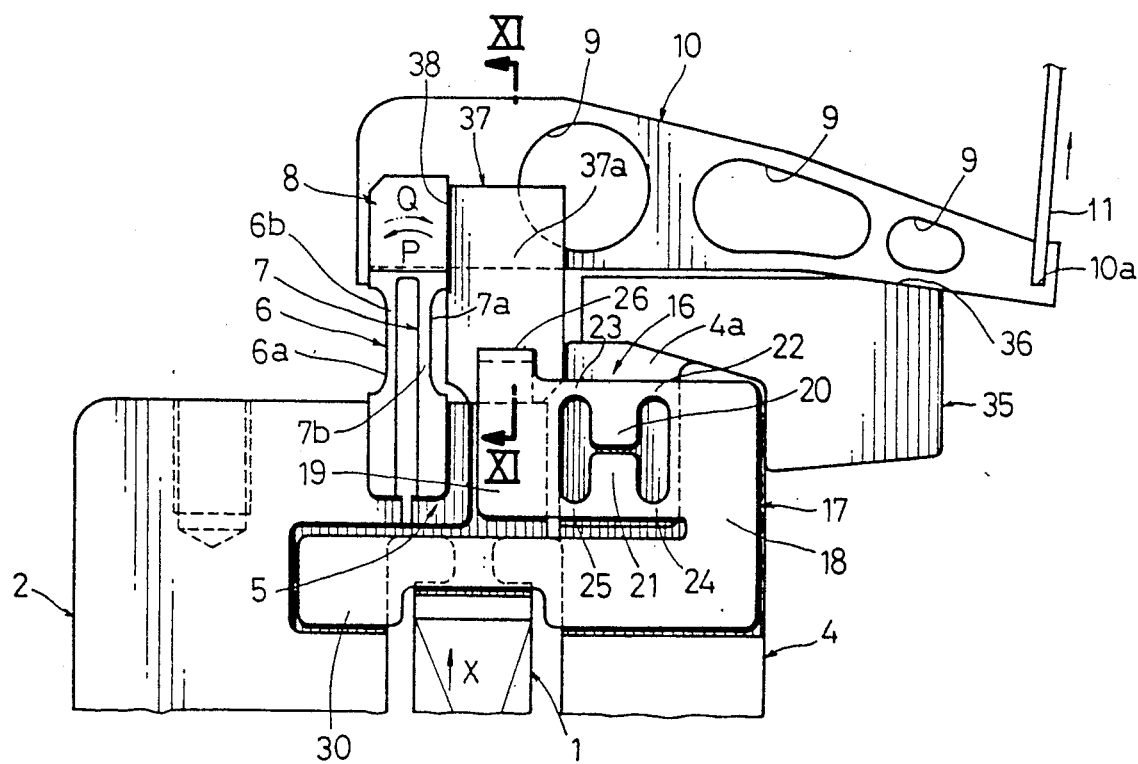
FIG. 10 is a side view of an essential part of FIG. 9.
Figure 11:
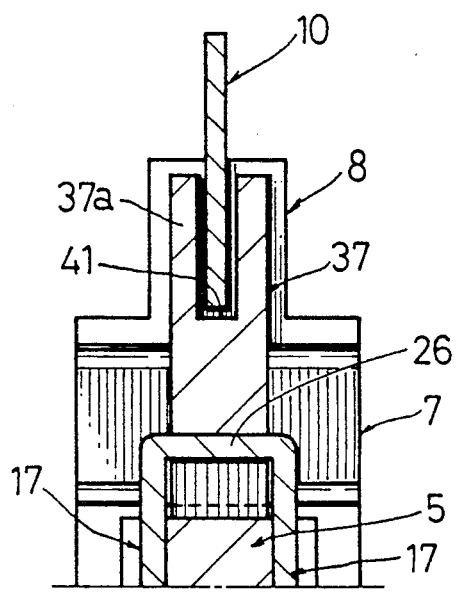
FIG. 11 is a cross-section taken along the line XI—XI in FIG. 10.
Figure 12:
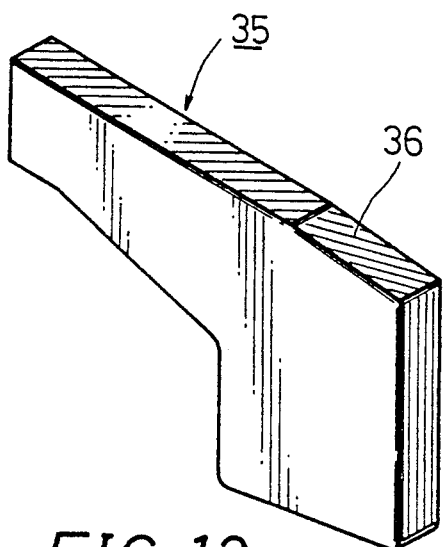
FIG. 12 is a perspective view of a first stopper member shown in FIG. 10.
Figure 13:
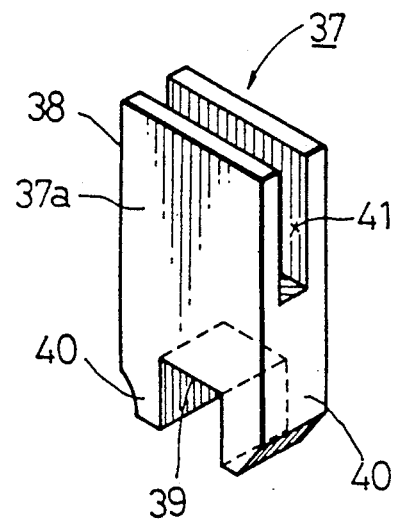
FIG. 13 is a perspective view of a second stopper member shown in FIG. 10.
Figure 14:
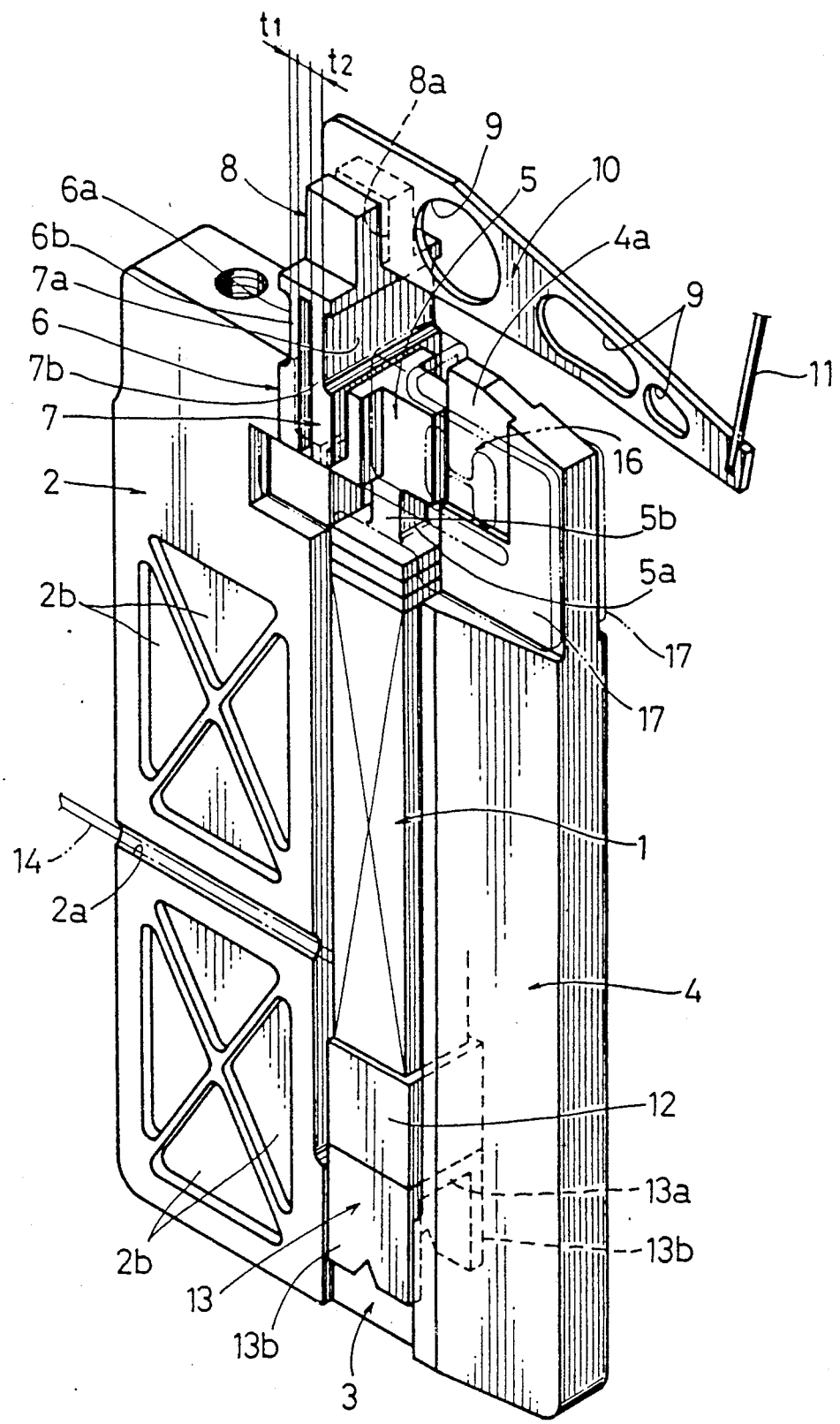
FIG. 14 is a perspective view of a third preferred embodiment of the device for magnifying displacement of a piezoelectric element according to the present invention.
Figure 15:
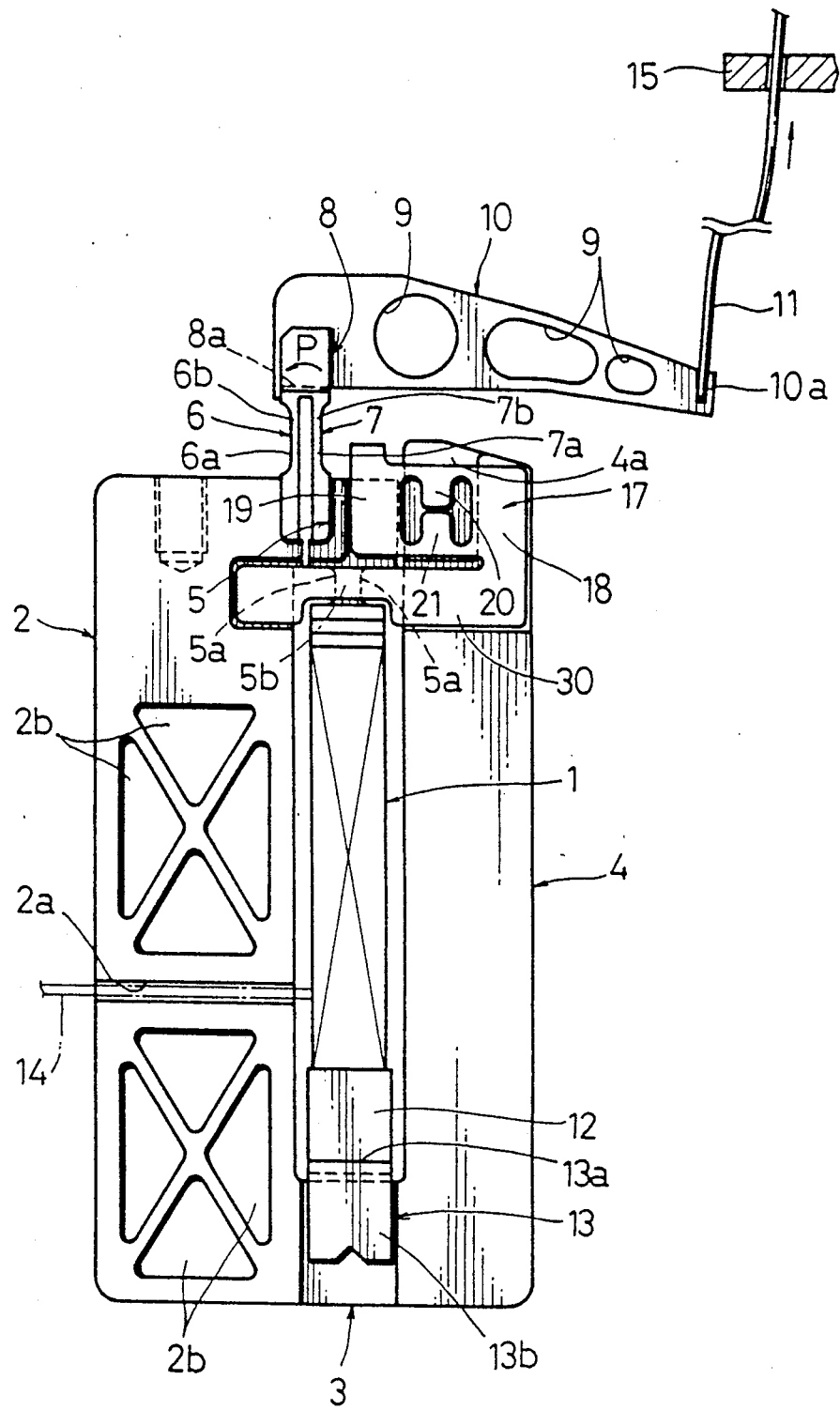
FIG. 15 is a side view of FIG. 14.

Then, as shown in FIG. 8, the link plates 17 connected with each other through the bridge portion 26 are so disposed as to cover the opposite side surfaces of the movable member 5 and the sub frame 4. Simultaneously, the connecting plates 30 integral with the link plates 17 are so disposed as to cover the opposite side surfaces of the main frame 2, the movable member 5 and the sub frame 4. Then, the integral piece of the link plates 17 and the connecting plates 30 is properly positioned by means of a positioning tool or the like. Then, the parallel vertical portions 18 of the link plates 17 are fixed to the opposite side surfaces of the sub frame 4, and the other parallel vertical portions 19 of the link plates 17 are fixed to the opposite side surfaces of the movable member 5. Similarly, the connecting plates 30 are fixed to the opposite side surfaces of the main frame 2 and the sub frame 4. Such fixation is carried out by spot welding, laser welding or the like. After fixation of the quadri-hinged parallel link mechanism, it is preferable to apply a silicone rubber or the like onto the link portion of the link mechanism in order to inhibit the generation of rust because the spring material (e.g., maraging steel) for the quadri-hinged parallel link mechanism tends to be corrosive.

Then, the preload member 13 is vertically movably mounted on the upper surface of the lateral projection of the main frame 2. On the other hand, the temperature compensating member 12 is fixed by adhesive to the lower end surface of the piezoelectric element 1. Then, the piezoelectric element 1 fixed with the temperature compensating member 12 is inserted between the upper surface of the preload member 13 and the lower surface of the movable member 5. Prior to insertion of the piezoelectric element 1, adhesive may be applied to the upper surface of the preload member 13 (or the lower surface of the temperature compensating member 12) and the lower surface of the movable member 5 (or the upper surface of the piezoelectric element 1). Then, the preload member 13 is upwardly moved to bring the piezoelectric element 1 into pressure contact with the movable member 5 under a predetermined compression load controlled by measuring the same with use of a load measuring device.

Under the load condition, the opposite side plates 13b of the preload member 13 are fixed to the opposite side surfaces of the lateral projection 3 by spot welding, laser welding or the like. Thus, the device for magnifying displacement of the piezoelectric element is manufactured.

As mentioned above, the main frame 2, the movable member 5 and the sub frame 4 are integrally formed from the frame body 31 by injection-molding and sintering. Therefore, each member can be easily manufactured at low cost.

Further, the main frame 2, the movable member 5 and the sub frame 4 are separated by forming the parting slits 33 and 34 in the frame body 31. Therefore, the highly accurate arrangement of these members can be obtained to thereby ensure high accuracy of the displacement magnifying device.

Further, the predetermined compression load controlled by the load measuring device is applied to the piezoelectric element 1 by the preload member 13, and the preload member 13 is fixed to the lateral projection 3 of the main frame 2. Therefore, the predetermined compression load can be accurately applied to the piezoelectric element 1, thereby ensuring sufficient and reliable displacement of the movable member 5 caused by the expansion of the piezoelectric element 1.

Although the frame body 3- is formed by injection-molding and sintering, it may be formed by any other methods such as forging, wiring cutting, laser cutting, machining or in combination therewith.

Referring next to FIGS. 9 to 13 which show a second preferred embodiment of the present invention having the same construction as the first preferred embodiment except the following structure, there is fixedly provided at the upper end of the sub frame 4 a first stopper member 35 formed of a damper material such as polybutylene terephthalate. The first stopper member 35 is fixed by adhesive or the like to the upper end surface and the partial side edge surface of the sub frame 4, and extends toward the lower end surface of the rocking arm 10. The first stopper member 35 is formed at its upper end with a slant stopper surface 36 separatably abutting against the lower end surface of the rocking arm 10 at a free end portion thereof.

Further, there is fixedly provided on the bridge portion 26 connecting the link plates 17 a second stopper member 37 formed of a damper material such as polybutylene terephthalate. The second stopper member 37 is formed at its lower end with a recess 39 to be engaged with the bridge portion 26, and with a pair of leg portions 40 having lower end surfaces abutting against the upper surface of the movable member 5. The recess 39 is fully engaged with the bridge portion 26, and is fixed thereto by adhesive or the like. The lower end surfaces of the leg portions 40 are attached or bonded by adhesive or the like to the upper surface of the movable member 5 to thereby support the second stopper member 37. The second stopper member 37 extends along the leaf spring 7 and the rocking block 8 to form an extended portion 37a having a stopper surface 38 separatably abutting against the right side surface of the rocking block 8 as viewed in FIG. 10, thereby stopping the rocking of the rocking block 8 in a direction of arrow Q in FIG. 10. The extended portion 37a of the second stopper member 37 is further formed with another recess 41 for loosely receiving the rocking arm 10 in such a manner as to permit the rocking motion of the rocking arm 10.

In operation, when the voltage applied to the piezoelectric element 1 is cut, the piezoelectric element 1 is contracted to the original condition, and the leaf springs 6 and 7 are also returned by their resilient forces to the original condition. Accordingly, there is generated a moment as depicted by the arrow Q in FIG. 10 in the rocking block 8, thereby returning the rocking block 8 to the original condition. At this time, the rocking block 8 is brought into abutment against the stopper surface 38 of the second stopper member 37, thereby restricting the return flexing of the leaf springs 6 and 7. Accordingly, the oscillation of the leaf springs 6 and 7 in the directions of arrows P and Q may be greatly reduced, and the elastic fatigue of the leaf springs 6 and 7 due to their oscillation may be reduced to thereby prevent buckling and breakage of the leaf springs 6 and 7 and improve the durability thereof.

On the other hand, when the rocking arm 10 is returned to its original condition, the lower end surface of the rocking arm 10 at the free end portion thereof is brought into abutment against the stopper surface 36 of the first stopper member 35, thereby stopping an excess downward rocking of the rocking arm 10 and preventing the flexing of the rocking arm 10.

As mentioned above, the oscillation of the leaf springs 6 and 7 and the flexing of the rocking arm 10 upon cutting of the voltage applied to the piezoelectric element 1 can be greatly suppressed by the first and second stopper members 35 and 37, thereby increasing a printing speed.

Although the first and second stopper members 35 and 37 are independently formed in the above preferred embodiment, these stopper members may be integrally formed as one unit.

Referring next to FIGS. 15 to 19 which show a third preferred embodiment of the present invention having the same construction as the first preferred embodiment except the following structure, the lower surface of the movable member 5 is separated from the upper surface of the piezoelectric element 1 to form a separatable portion 33. The separatable portion 33 is provided with a pair of separatable layers 31 and 32 formed of a wear resisting material such as zirconia ceramic. The separatable layers 31 and 32 separatably abut against each other, and the separatable layer 31 is fixed by adhesive to the lower surface of the movable member 5, while the separatable layer 32 is fixed by adhesive to the upper surface of the piezoelectric element 1.

The temperature compensating member 12 is fixed by adhesive to the lower surface of the piezoelectric element 1, and is also fixed by adhesive to the upper surface of the preload member 13.

In operation, when the piezoelectric element 1 is contracted to the original condition, the movable member 5 is returned to the original condition. At this time, the return of the movable member 5 is delayed because of inertia of the movable member 5, the leaf springs 6 and 7, the rocking block 8, the rocking arm 10 and the printing wire 11. As a result, the separatable layers 31 and 32 come into separation from each other by a small quantity, so that a tensile force to be applied to the piezoelectric element 1 may be greatly reduced.

Although the separatable portion 33 is provided between the movable member 5 and the piezoelectric element 1 in the above preferred embodiment, any other modifications may be made in the following manner according to the present invention.

Figure 16:
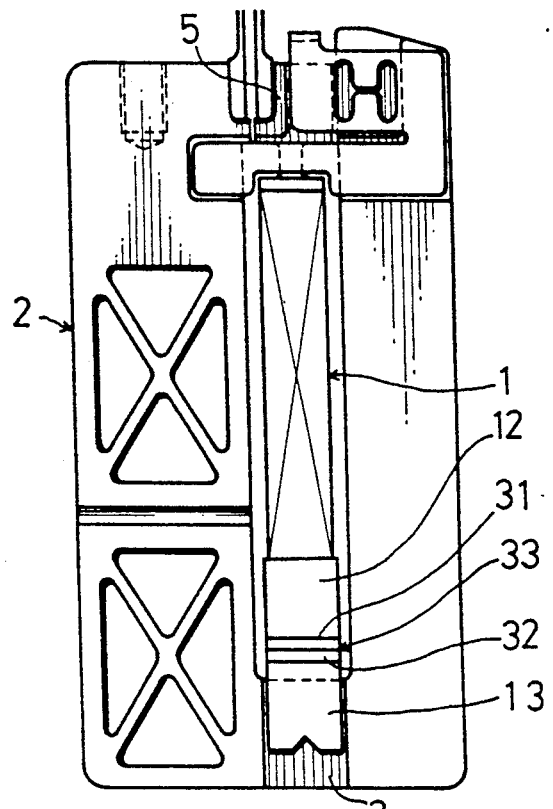
FIGS. 16 to 19 are side views of various modifications of the device shown in FIG. 14.

Referring to FIG. 16, the separatable portion 33 is provided between the temperature compensating member 12 and the preload member 13, and the separatable layers 31 and 32 formed of a wear resisting and heat insulating material such as zirconia ceramic are interposed between the temperature compensating member 12 and the preload member 13. In this case, heat generated in the piezoelectric element 1 and transmitted to the temperature compensating member 12 is insulated from being transmitted to the preload member 13 by the provision of the separatable layers 31 and 32 having a heat insulating property. Therefore, the temperature compensating member 13 is effectively heated to thereby effect the temperature compensating function.

Figure 17:
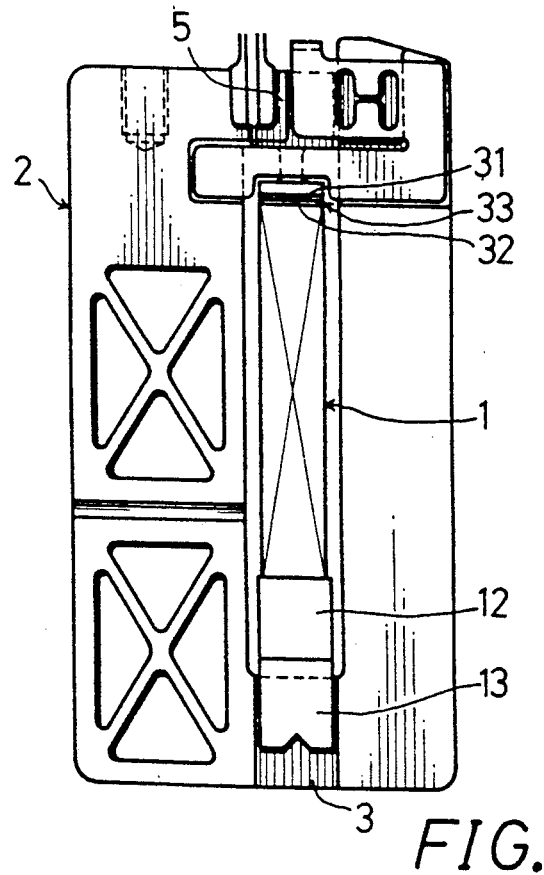

Although the separatable layers 31 and 32 are formed of zirconia ceramic in the above preferred embodiment, they may be formed of a thin-walled synthetic resin film as shown in FIG. 17.

Figure 18:
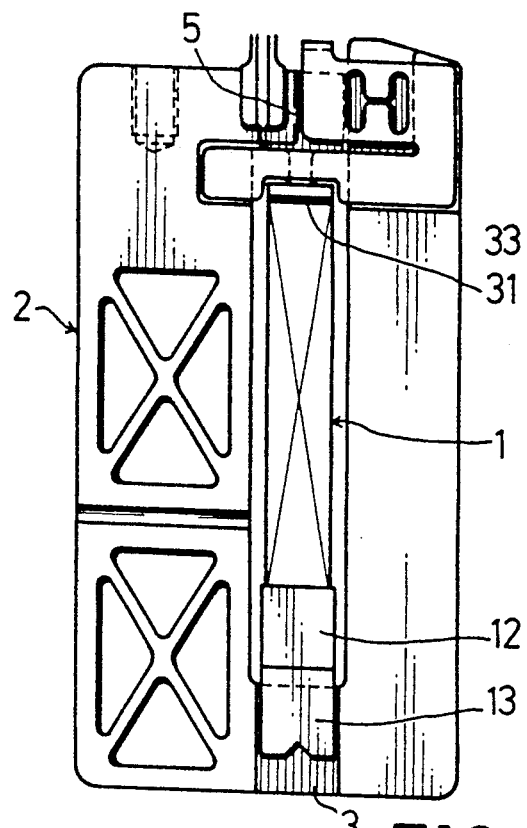

Further, although the above preferred embodiment employs the pair of separatable layers 31 and 32, the separatable layer 31 only may be provided as shown in FIG. 18.

Figure 19:
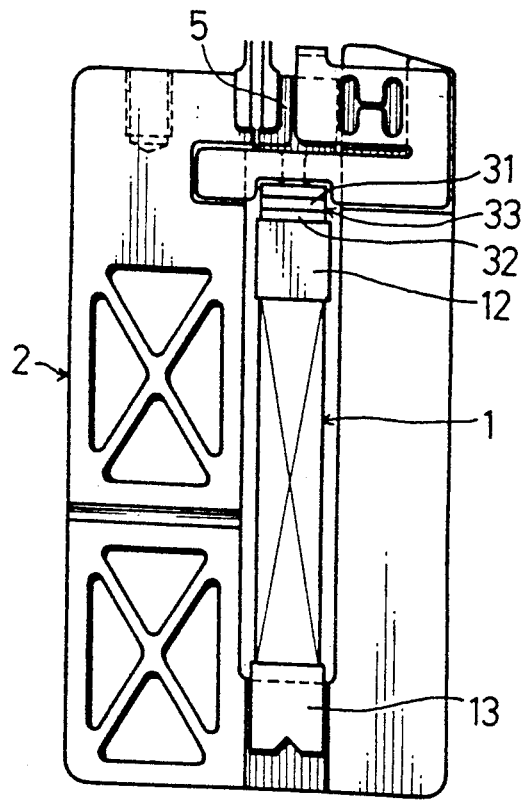
Figure 20:
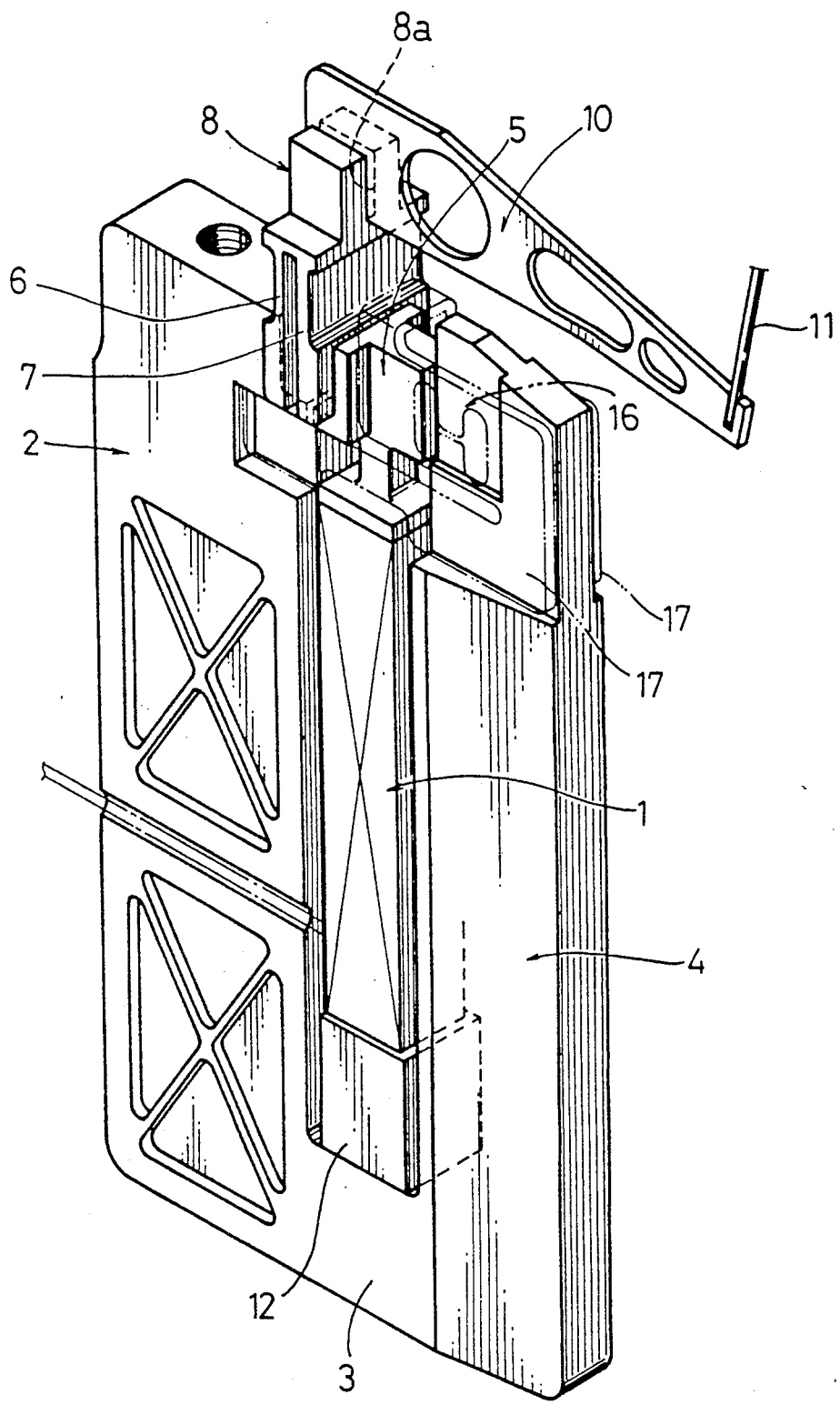
FIG. 20 is a perspective view of a fourth preferred embodiment of the device for magnifying displacement of a piezoelectric element according to the present invention.
Figure 21:
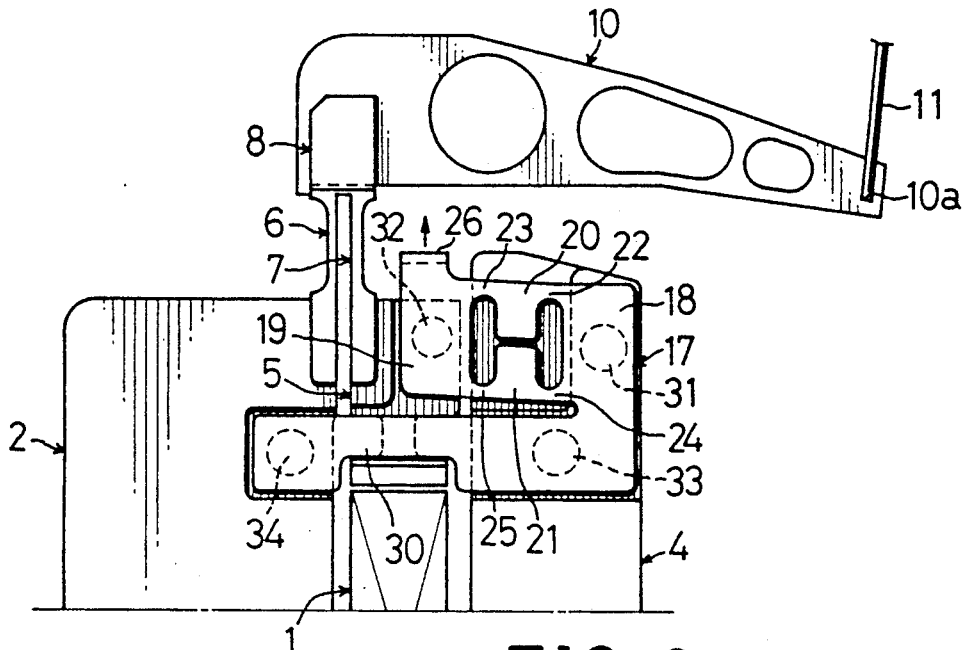
FIG. 21 is a side view of an essential part of the device shown in FIG. 20, illustrating the condition where the link plates are lifted and welded to the movable member.
Figure 22:
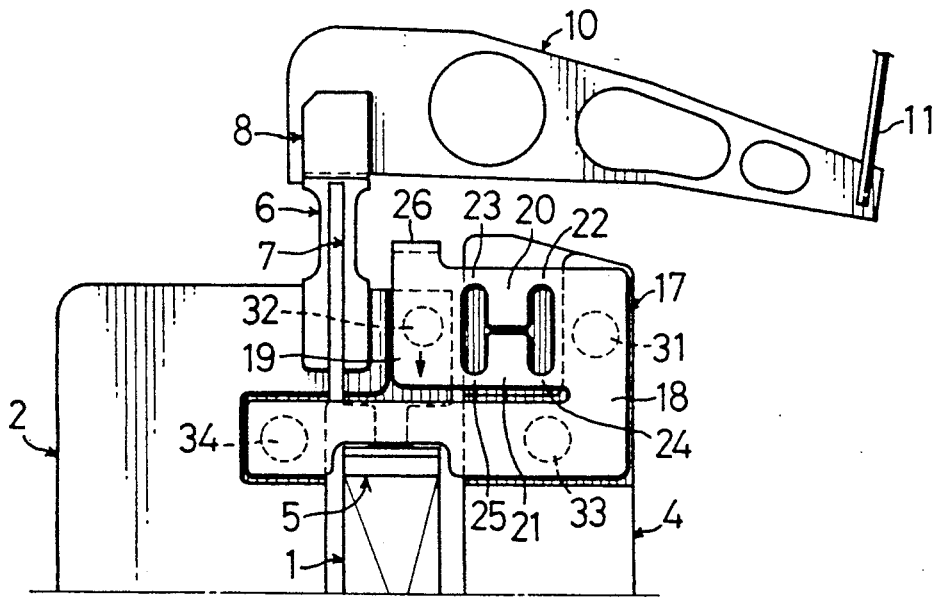
FIG. 22 is a view similar to FIG. 21, illustrating the condition where a compression load is applied to the piezoelectric element by the elastic force of the link plates.
Figure 23:
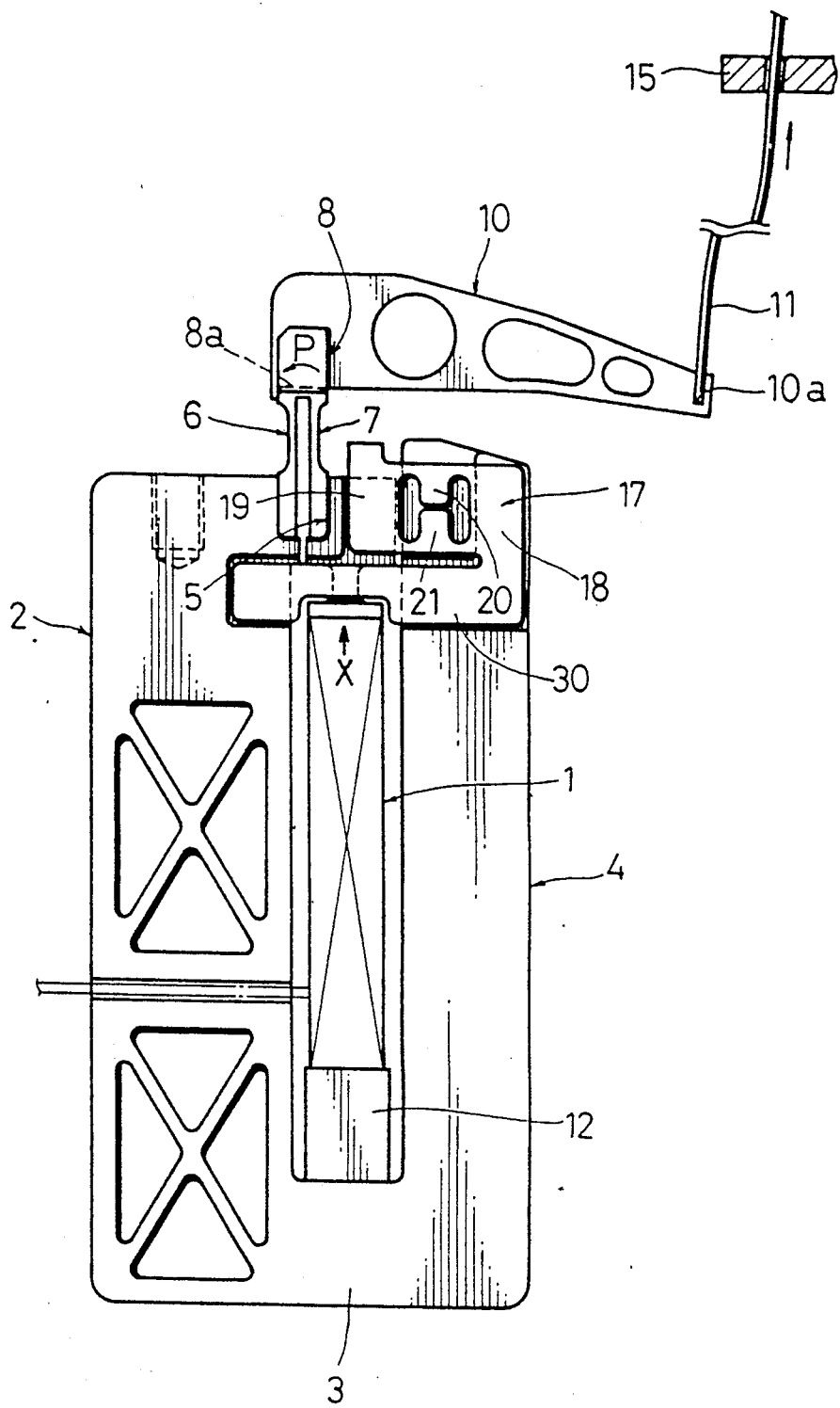
FIG. 23 is a side view of FIG. 20.
Figure 24:
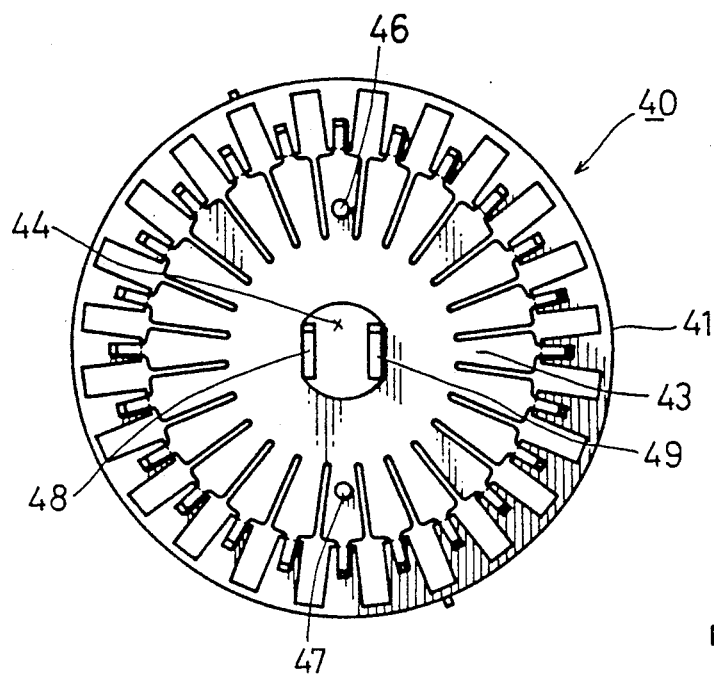
FIG. 24 is a front elevational view of a holder constituting a printing head according to the present invention.
Figure 25:
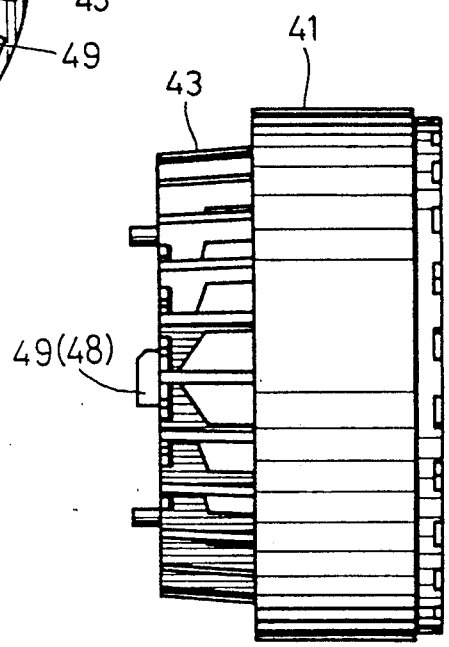
FIG. 25 is a right side view of FIG. 24.
Figure 26:
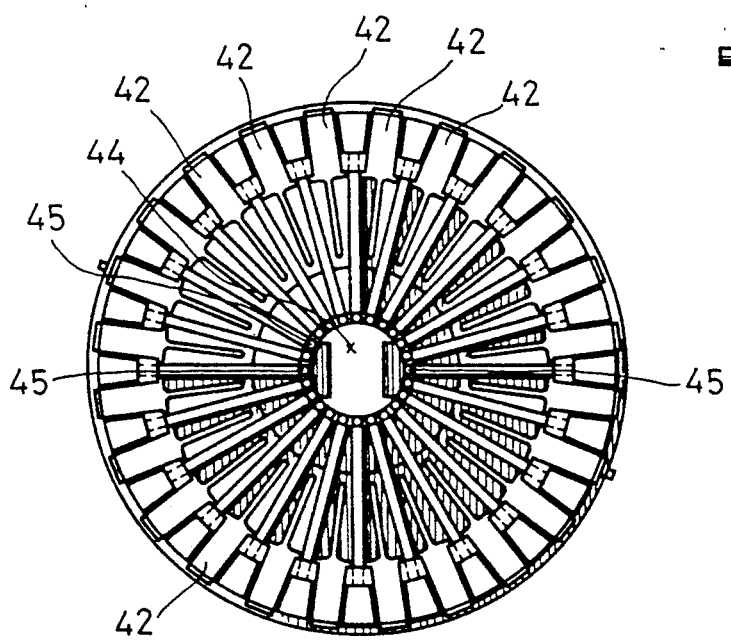
FIG. 26 is a rear elevational view of the holder.
Figure 27:
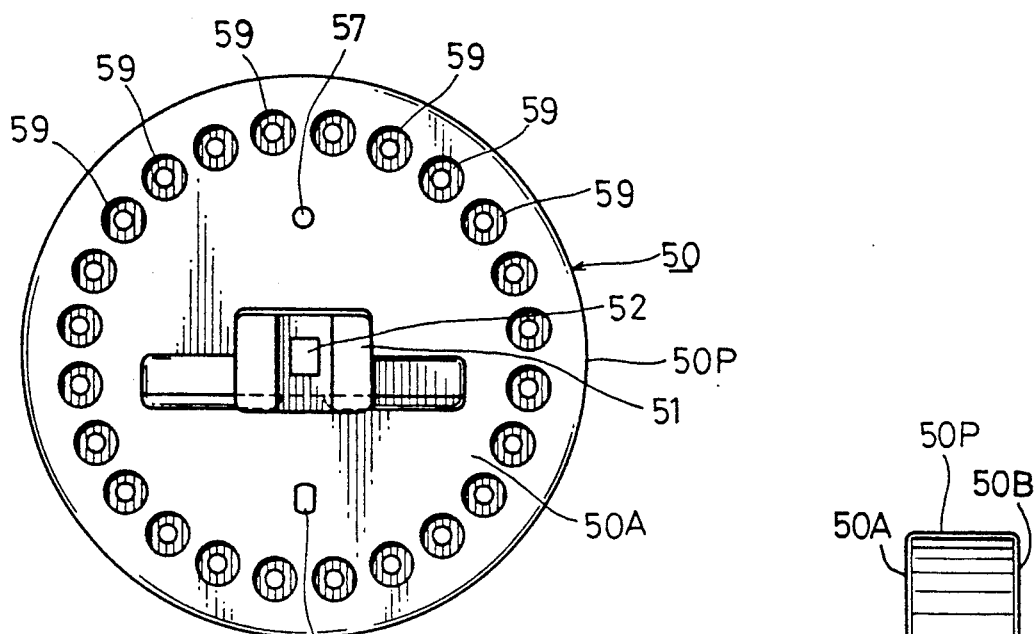
FIG. 27 is a front elevational view of a cover plate constituting the printing head.
Figure 28:
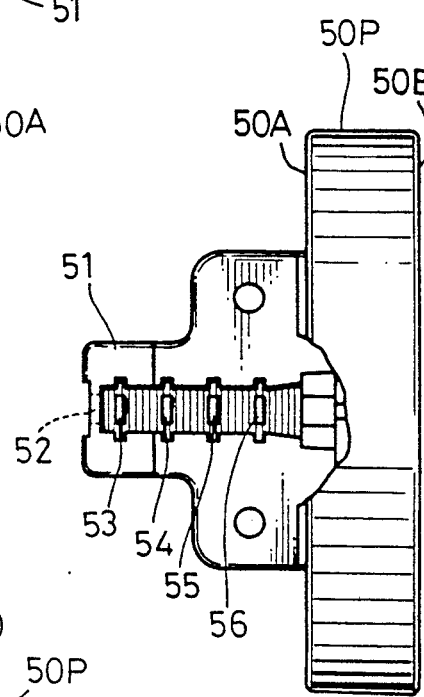
FIG. 28 is a bottom plan view of FIG. 27.
Figure 29:
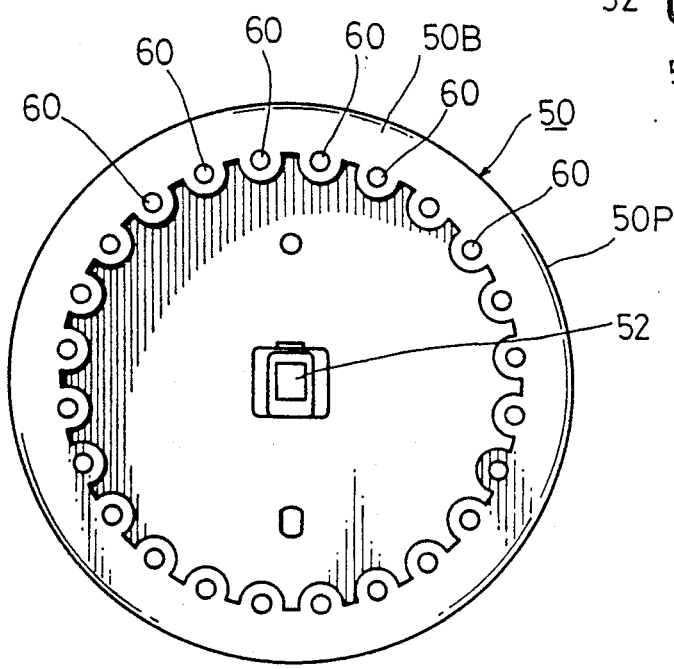
FIG. 29 is a rear elevational view of the cover plate.

Further, although the temperature compensating member 12 is provided between the piezoelectric element 1 and the preload member 13 in the above preferred embodiment, the temperature compensating member 12 and the separatable layers 31 and 32 may be provided between the movable member 5 and the piezoelectric element 1 as shown in FIG. 19.

Further, the separatable layers 31 and 32 may be omitted to form the separatable portion 33 at least one of between the movable member 5 and the piezoelectric element 1 and between the piezoelectric element 1 and the lateral projection 3.

Further, a plurality of the separatable portions 33 having the separatable layers 31 and 32 may be provided between opposed surfaces among the movable member 5, the piezoelectric element 1 and the lateral projection 3 of the main frame 2.

Referring next to FIGS. 20 to 23 which show a fourth preferred embodiment of the present invention having the same construction as the first preferred embodiment except the following structure, the preload member 13 used in the first preferred embodiment is omitted in the fourth preferred embodiment, and the temperature compensating member 12 is directly mounted on the lateral projection 3 of the main frame 2.

The quadri-hinged parallel link mechanism 16 is mounted and fixed to the sub frame 4 and the movable member 5 in the following manner. First, the vertical parallel portions 18 of the link plates 17 constituting the quadri-hinged parallel link mechanism 16 are fixed by spot welding or the like at 31 to the opposite side surfaces of the sub frame 4. At the same time, the connecting plates 30 are fixed by spot welding or the like at 33 and 34 to the opposite side surfaces of the sub frame 4 and the main frame 2, respectively. Then, the vertical parallel portions 19 of the link plates 17 are lifted against the elasticity of the hinge portions 22 to 25 as shown by an arrow in FIG. 21. Under the lifted condition of the vertical parallel portions 19, the vertical parallel portions 19 are fixed by spot welding or the like at 32 to the opposite side surfaces of the movable member 5. As a result, the vertical parallel portions 19 fixed to the movable member 5 are lowered by the elastic return force of the hinge portions 22 to 25 to thereby apply a given compression load to the piezoelectric element 1 through the movable member 5 and bring the movable member 5, the piezoelectric element 1, the temperature compensating member 12 and the lateral projection 3 into pressure contact with each other.

As mentioned above, the movable member 5 is pressed on the upper end surface of the piezoelectric element 1 by the elastic force of the hinge portions 22 to 25 of the link plates 17. Accordingly, the respective opposed surfaces of the movable member 3, the piezoelectric element 1, the temperature compensating member 12 and the lateral projection 3 are maintained in pressure contact with each other, and a given compression load can be applied to the piezoelectric element 1. Furthermore, the movable member 5 can be displaced in parallel to the direction of displacement of the piezoelectric element 1 by the parallel link plates 17, thus enabling the movable member to be displaced sufficiently in concert with the expansion of the piezoelectric element 1 in the direction of arrow X in FIG. 23.

Although the link plates 17 are integrally formed with the connecting plates 30, they may be formed independently of the connecting plates 30, or the connecting plates 30 may be omitted.

Further, the fixation of the link plates 17 may be modified in the following manner. First, the vertical parallel portions 19 are fixed to the opposite side surfaces of the movable member 5. Then, the vertical parallel portions 18 are lowered against the elasticity of the hinge portions 22 to 25. Under the lowered condition of the vertical parallel portions 19, the vertical parallel portions 18 are fixed to the opposite side surfaces of the sub frame 4. As a result, the vertical parallel portions 19 are lowered by the elastic return force of the hinge portions 22 to 25 to thereby apply a given compression load to the piezoelectric element 1 through the movable member 5.

Referring next to FIGS. 24 to 36 which show a fifth preferred embodiment of the present invention wherein there is shown a printing head employing the displacement magnifying device of the first preferred embodiment as a printing unit, reference numeral 40 designates a generally cylindrical holder for mounting therein twenty-four printing units PU. The holder 40 is formed with a cylindrical portion 41 formed of synthetic resin. An inner circumferential surface of the cylindrical portion 41 is formed with twenty-four slits 42 for receiving the twenty-four printing units PU, respectively. The slits 42 are located at circumferentially equal intervals (i.e., spaced at an angle of 15 degrees), and extend radially inwardly.

The cylindrical portion 41 is integrally formed with a guide portion 43 for supporting the rocking arm 10 of each printing unit PU inserted into each slit 42. The guide portion 43 has a central hole 44 around which twenty-four guide posts 45 are provided projecting inwardly and arranged at circumferentially equal intervals, each guide post for guiding each rocking arm 10. That is, each rocking arm 10 is positioned between the adjacent guide posts 45.

The guide portion 43 is further formed with a pair of guide pins 46 and 47 extending outwardly and arranged at diametrically opposite positions with respect to the central hole 44. As will be hereinafter described, the guide pins 46 and 47 are engaged with a pair of guide holes 57 and 58 of a cover plate 50. The central hole 44 of the guide portion 43 is formed at its outer periphery with a pair of projections 48 and 49 projecting outwardly for guiding the holder 40 to be assembled with the cover plate 50.

The cover plate 50 formed of metal such as aluminum is formed with a cylindrical portion 50P and a hollow nose portion 51 projecting leftward from the cylindrical portion 50P (as viewed in FIG. 28) for guiding the printing wire 11 of each printing unit PU. The nose portion 51 is formed at its left end with an opening 52 for permitting projection of the printing wires 11. The nose portion 51 is formed on its inner surface with a plurality of arcuate grooves 53, 54, 55 and 56 arranged in longitudinally spaced relationship from each other. Further, the cylindrical portion 50P is formed with guide holes 57 and 58 to be engaged with the guide pins 46 and 47 of the holder 40, respectively. The guide hole 58 is slightly larger than the guide hole 57 for the purpose of easy fitting of the guide holes 57 and 58 with the guide pins 46 and 47.

The cylindrical portion 50P is formed on its left side surface 50A (as viewed in FIG. 28) with twenty-four holes 59 arranged at circumferentially equal intervals for inserting screws 61, and is also formed on its right side surface 50B with twenty-four tapped holes 60 coaxially corresponding to the twenty-four holes 59 for threadedly engaging the screws 61.

Figure 30:
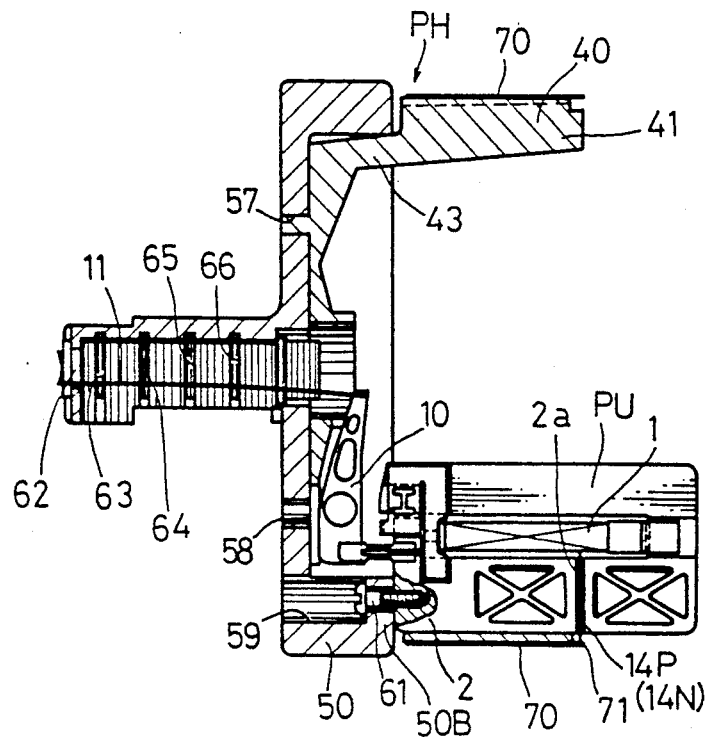
FIG. 30 is a vertical sectional view of the assembly of the holder, the cover plate and the printing units.
Figure 31:
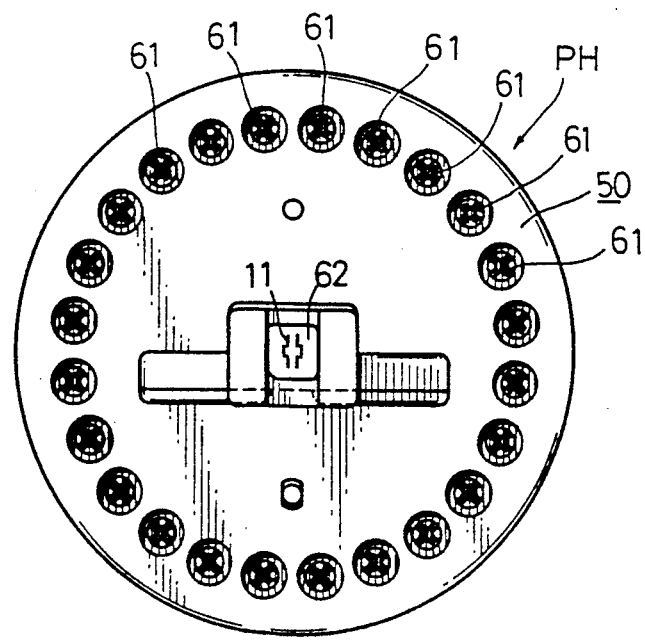
FIG. 31 is a front elevational view of the printing head.
Figure 32:
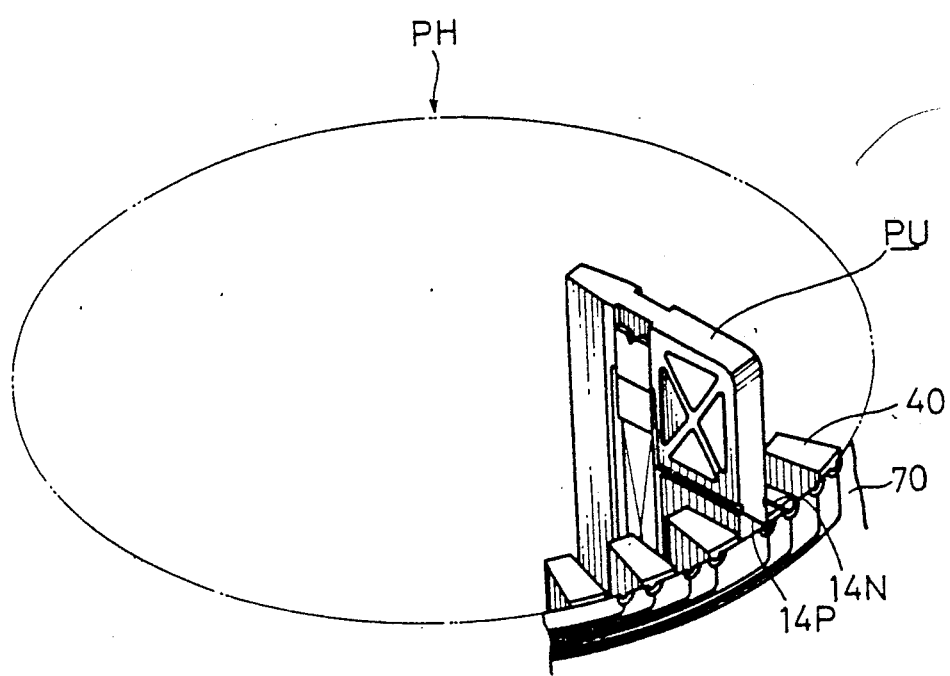
FIG. 32 is a schematic perspective view of the printing head.

Referring to FIGS. 30 to 32 which show a condition where the holder 40 and the cover plate 50 are assembled with each other, and the printing units PU are mounted in the assembly to form a printing head PH, each printing unit PU is inserted into the corresponding slit 42 of the holder 40, and the rocking arm 10 of each printing unit PU is guided by the guide portion 43. Further, each printing wire 11 is reciprocatably guided in the nose portion 51. The left end of the main frame 2 of each printing unit PU abuts against the right side surface 50B of the cover plate 50 as viewed in FIG. 30. Each printing unit PU is fixed by the corresponding screw 61 to the cover plate 50.

As shown in FIG. 30, a plurality of guide plates 62, 63, 64, 65 and 66 each having twenty-four holes for inserting the printing wires 11 are engaged with the opening 52 and the arcuate grooves 53 to 56, respectively. Thus, the printing wires 11 are reciprocatably guided by the guide plates 62 to 66.

As shown in FIG. 31, there may be viewed tips of the printing wires 11 projecting from the guide plate 62 engaged with the opening 52 of the nose portion 51. Further, there may be viewed head portions of the screws 61 having fixed the printing units PU to the cover plate 50.

Figure 33:
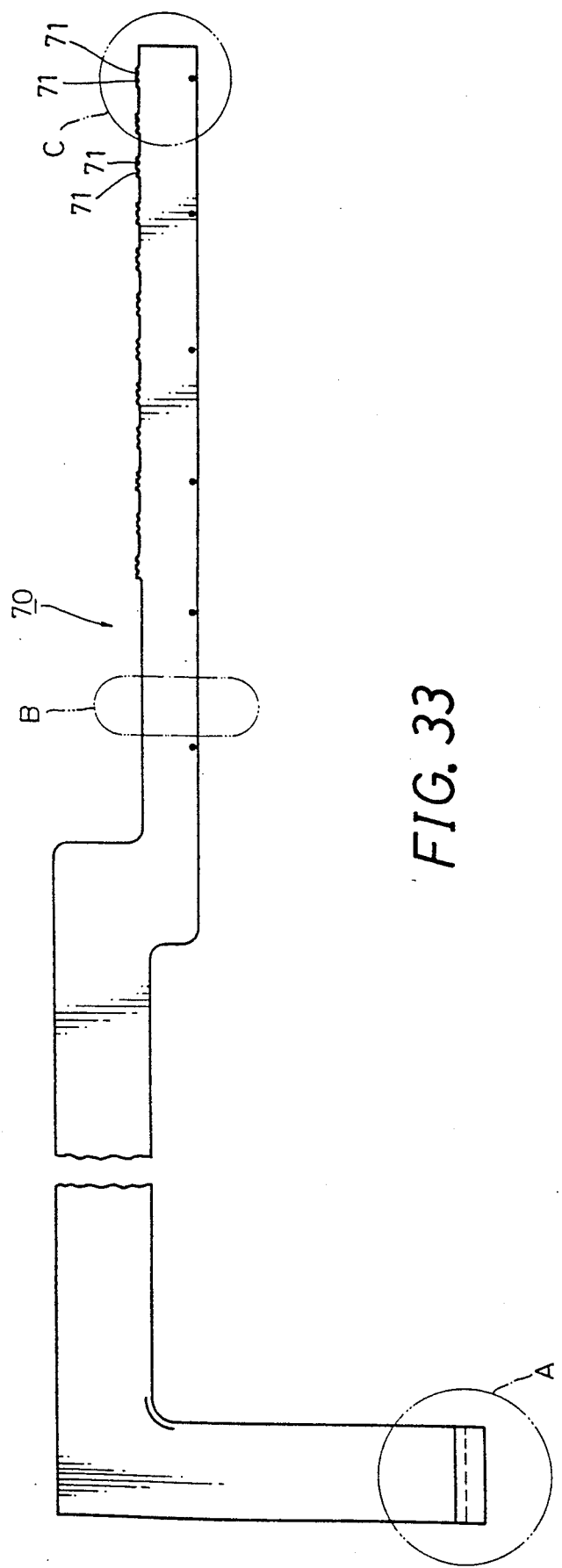
FIG. 33 is a plan view of a flexible printed wiring board to be wound around the holder.
Figure 37:
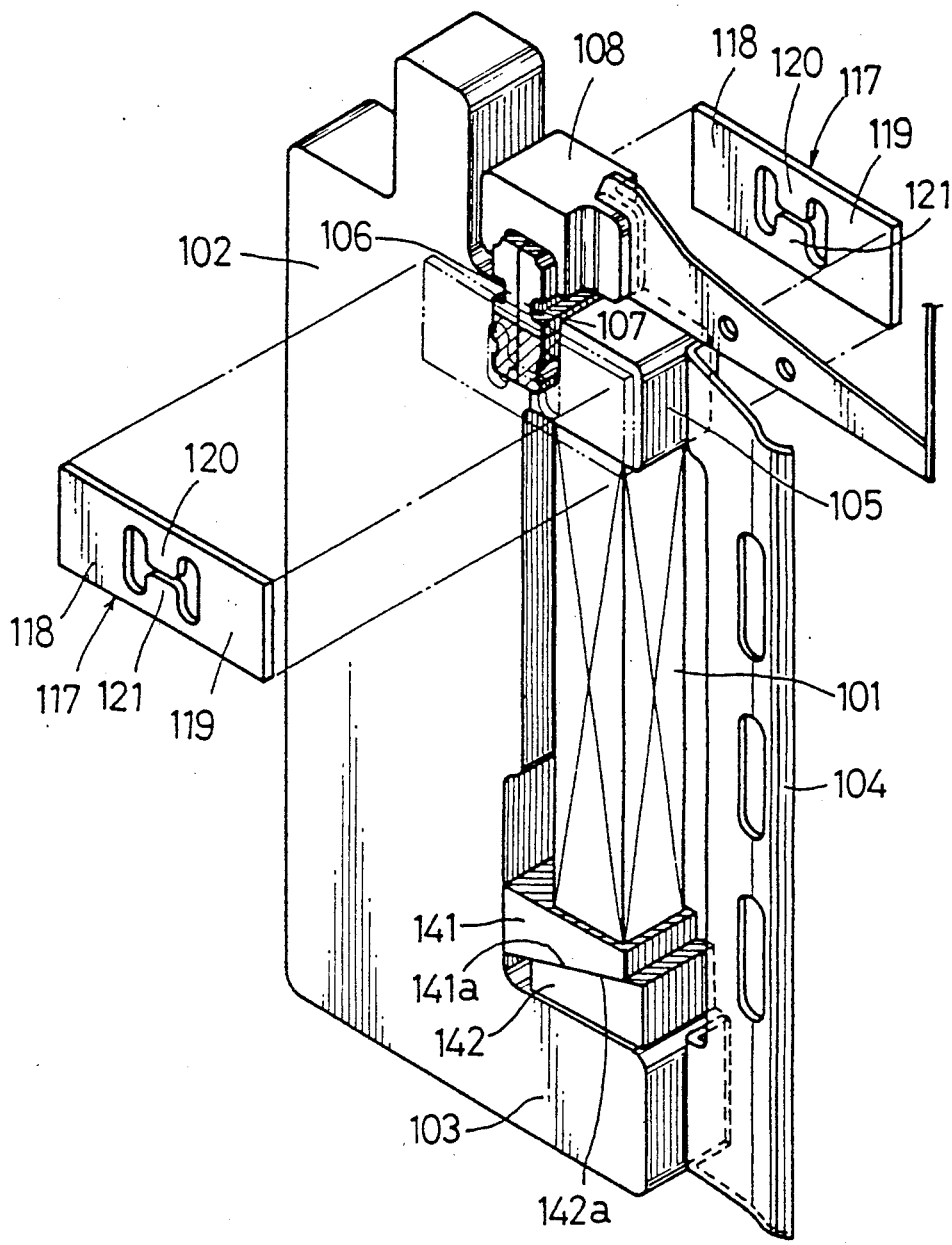
FIG. 37 is a perspective view of a device for magnifying displacement of a piezoelectric element in the prior art.
Figure 38:
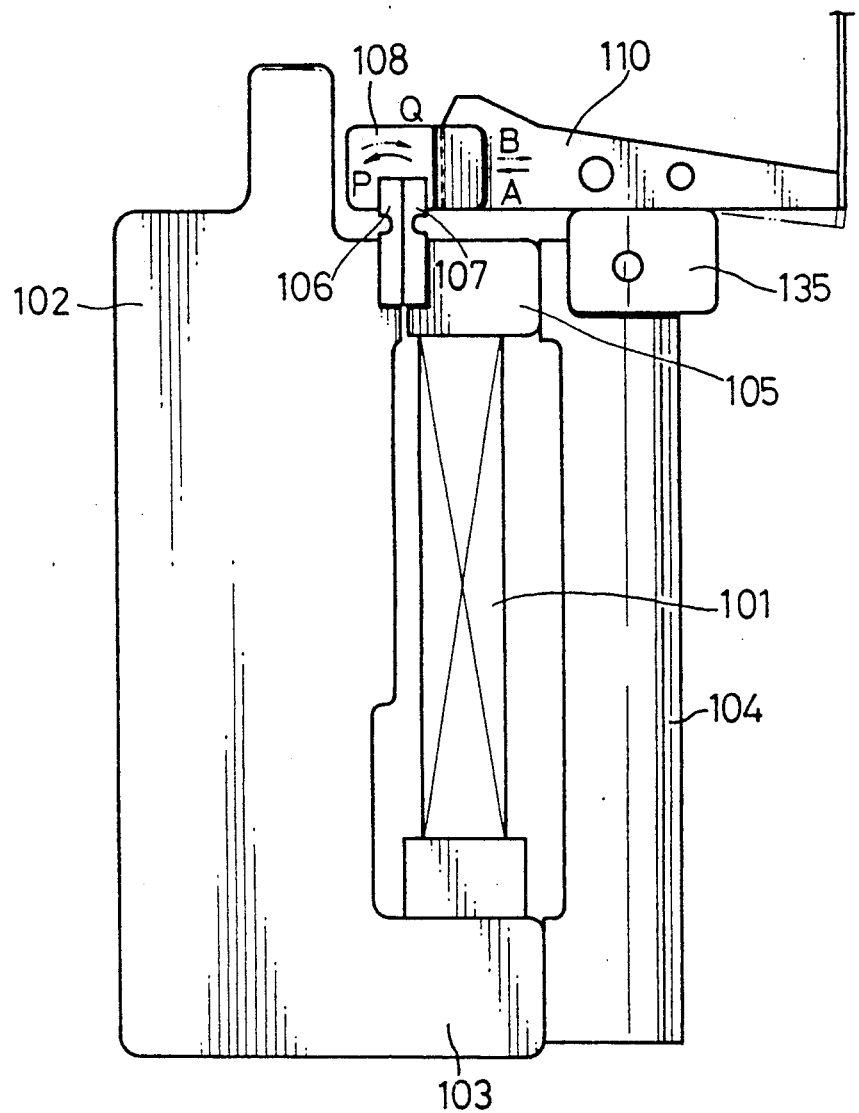
FIG. 38 is a side view of another example of the prior art device.
Figure 39:
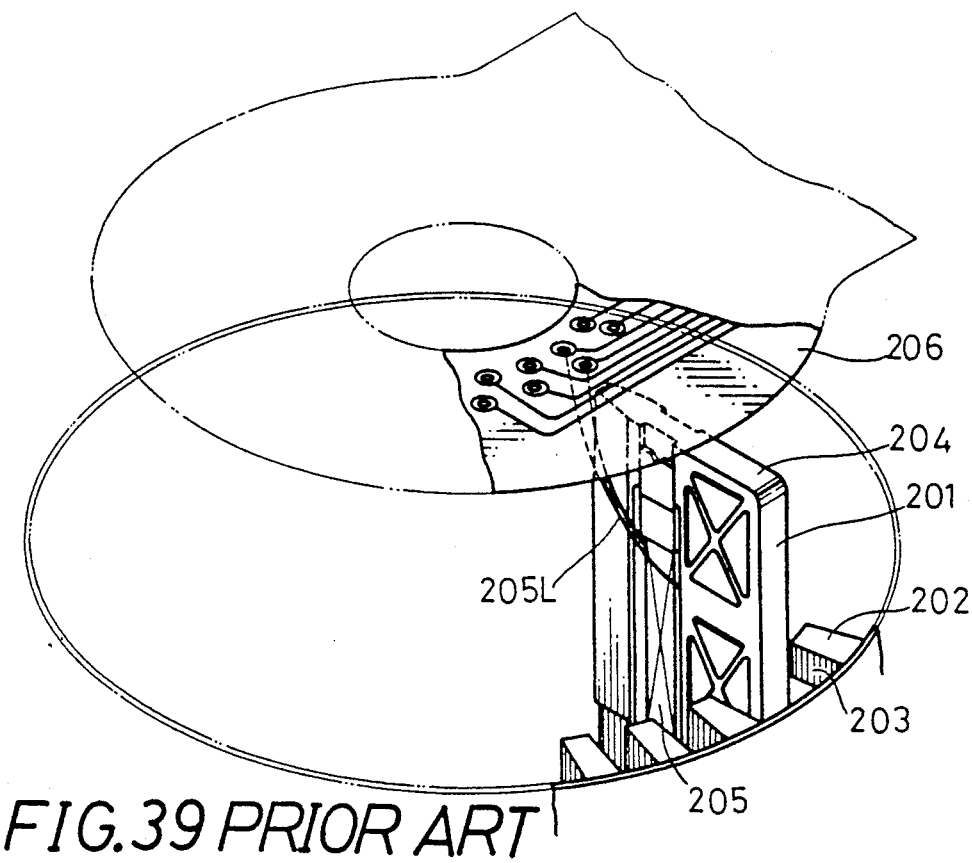
FIG. 39 is a schematic perspective view of a printing head in the prior art.
Figure 40:
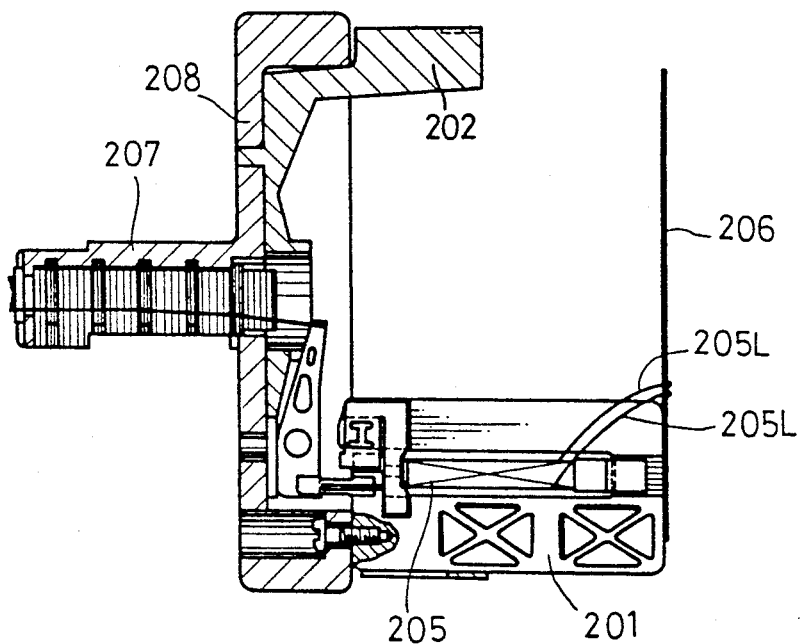
FIG. 40 is a vertical sectional view of the printing head shown in FIG. 39.

After assembling the printing head PH as mentioned above, a flexible printed wiring board 70 as shown in FIG. 33 is partially wound around the outer circumferential surface of the cylindrical portion 41 of the holder 40 as shown in FIGS. 30 and 32. The flexible printed wiring board 70 is formed by printing a desired number of conductors 72 each having a width of about 1 mm on a polyester film in such a manner that the conductors 72 are arranged at equal intervals of about 0.3 mm and overlaying another polyester film on the conductors 72 printed.

Referring to FIGS. 33 to 36, a portion 70a of the flexible printed wiring board 70 to be wound around the cylindrical portion 41 of the holder 40 is formed at its longitudinal edge with plural pairs of cutouts 70b arranged at a pitch of arrangement of the printing units PU. As shown in FIGS. 32 and 36, each pair of cutouts 70b is provided with a pair of connection terminals 71 to be connected to the positive and negative lead wires 14P and 14N extending from each piezoelectric element 1. The connection terminals 71 are connected through the printed conductors 72 to end terminals 73 formed at an end portion A shown in FIG. 33. These end terminals 73 are connected through a connector (not shown) to a printing head control circuit (not shown). A portion 70c of the flexible printed wiring board 70 formed between the winding portion 70a and the end portion A is maintained in a free condition where it can be flexed in association with axial movement of the printing head.

As shown in FIG. 34 which is an enlarged view of the end portion A, the overlaid film of the flexible printed wiring board 70 is removed to form a conductor exposed portion 73A having a vertical length of about 6 mm.

As mentioned above, the winding portion 70a of the flexible printed wiring board 70 is wound around the cylindrical portion 41 of the holder 40 in such a manner that the cutouts 70b are so disposed as to correspond to the guide channels 2a of each piezoelectric element 1, and the lead wires 14P and 14N of each piezoelectric element 1 disposed in the guide channels 2a are electrically connected to the connection terminals 71 at the cutouts 70b by soldering or the like. Accordingly, in the event that one of the printing units PU is broken to need the exchange thereof, it is only necessary to remove the lead wires 14P and 14P of the broken printing unit PU from the corresponding connection terminals 71 and thereafter loosen the corresponding screw 61 to remove the printing unit PU.

Having thus described the preferred embodiments of the invention, it should be understood that numerous structural modifications and adaptations may be made without departing from the spirit of the invention.

What is claimed is:

1. A device for magnifying displacement of an elongated piezoelectric element adapted to be displaced by application of voltage thereto, comprising:

a main frame extending along one side of said piezoelectric element and having a lateral projection for supporting one end of said piezoelectric element with respect to a direction of displacement of said piezoelectric element;

a movable member mounted on the other end of said piezoelectric element with respect to the direction of displacement of said piezoelectric element;

a first leaf spring fixed at its one end portion to said main frame;

a second leaf spring fixed at its one portion to said movable member and disposed in opposed relationship to said first leaf spring;

a rocking member fixedly connected to the other end of said first leaf spring and the other end of said second leaf spring and adapted to be rocked by flexing of said first and second leaf springs to be generated by the displacement of said piezoelectric element;

a sub frame extending along the other side of said piezoelectric element opposite to said main frame to a position opposed to said movable member and fixedly connected at its one end to said lateral projection of said main frame; and a quadri-hinged parallel link mechanism fixed to said movable member and the other end of said sub frame, so as to displace said movable member in parallel to the direction of displacement of said piezoelectric element.

2. The device as defined in claim 1, wherein said piezoelectric element is formed of stacked piezoelectric ceramics.

3. The device as defined in claim 1, wherein said main frame is formed of a substantially rectangular metal plate having a predetermined thickness and extends in a direction substantially parallel to the direction of displacement of said piezoelectric element.

4. The device as defined in claim 1 further comprising a temperature compensating member and a preload member both interposed between said piezoelectric element and said lateral projection, said temperature compensating member having a characteristic of temperature-linear expansion contrary to that of said piezoelectric element, said preload member serving to apply a given compression load to said piezoelectric element in a rest position of said piezoelectric element.

5. The device as defined in claim 1, wherein said main frame and said sub frame are integrally formed with each other through said lateral projection.

6. A device for magnifying displacement of an elongated piezoelectric element adapted to be displaced by application of voltage thereto, comprising:

a main frame extending along one side of said piezoelectric element and having a lateral projection for supporting one end of said piezoelectric element with respect to a direction of displacement of said piezoelectric element;

a movable member mounted on the other end of said piezoelectric element with respect to the direction of displacement of said piezoelectric element;

a first leaf spring fixed at its one end portion to said main frame;

a second leaf spring fixed at its one portion to said movable member and disposed in opposed relationship to said first leaf spring; and a rocking member fixedly connected to the other end of said first leaf spring and the other end of said second leaf spring and adapted to be rocked by flexing of said first and second leaf springs to be generated by the displacement of said piezoelectric element;

wherein said first and second leaf springs are formed with first and second elastically deformable portions, respectively, and said second elastically deformable portion of said second leaf spring has a rigidity greater than that of said first elastically deformable portion of said first leaf spring.

7. The device as defined in claim 6, wherein said second elastically deformable portion of said second leaf spring is thicker than said first elastically deformable portion of said first leaf spring.

8. The device as defined in claim 6, wherein said first and second leaf springs have a width greater than a thickness of said main frame and said movable member.

9. The device as defined in claim 6, wherein said first and second leaf springs are spaced by a predetermined clearance.

10. The device as defined in claim 1, wherein said first and second leaf springs are integrally formed with said rocking member.

11. The device as defined in claim 7, wherein said first and second leaf springs are recessed at their outer side surfaces to form said first and second elastically deformable portions, respectively.

12. The device as defined in claim 1, wherein said quadri-hinged parallel link mechanism comprises a pair of link plates and a bridge portion for bridging said link plates.

13. The device as defined in claim 12, wherein each of said link plates comprises a pair of parallel vertical portions fixed to a side surface of said sub frame and a side surface of said movable member, a pair of parallel horizontal portions extending between said parallel vertical portions, and four elastically deformable hinge portions connecting said parallel vertical portions with said parallel horizontal portions.

14. The device as defined in claim 13, wherein said sub frame has a thin-walled portion at a position where said parallel horizontal portions and said hinge portions are disposed, so as not to contact opposite side surfaces of said thin-walled portion.

15. The device as defined in claim 11, wherein said movable member is formed with a neck portion having a rigidity greater than that of said second elastically deformable portion and adapted to be elastically expanded and contracted in the direction of displacement of said piezoelectric element.

16. A device for magnifying displacement of an elongated piezoelectric element adapted to be displaced by application of voltage thereto, comprising:

a main frame extending along one side of said piezoelectric element and having a lateral projection for supporting one end of said piezoelectric element with respect to a direction of displacement of said piezoelectric element;

a movable member mounted on the other end of said piezoelectric element with respect to the direction of displacement of said piezoelectric element;

a first leaf spring fixed at its one end portion to said main frame;

a second leaf spring fixed at its one end portion to said movable member and disposed in opposed relationship to said first leaf spring;

a rocking arm connected at its one end with the other ends of said first and second leaf springs and extending in a direction substantially perpendicular to the direction of displacement of said piezoelectric element, said rocking arm being rockable by flexing of said first and second leaf springs;

a first stopper member for restricting flexing of said rocking arm upon cutting of the application of voltage to said piezoelectric element; and a second stopper member for restricting flexing of said second leaf spring upon cutting of the application of voltage to said piezoelectric element.

17. The device as defined in claim 16, further comprising a rocking block fixedly connected to the other end of said first leaf spring and the other end of said second leaf spring and also fixed to the one end of said rocking arm, said rocking block being adapted to be rocked by flexing of said first and second leaf springs, wherein said first stopper member has a stopper surface separatably abutting against a longitudinal edge of said rocking arm at the other end portion thereof, and said second stopper member has a stopper surface separatably abutting against a side surface of said rocking block.

18. The device as defined in claim 17, further comprising a sub frame extending along the other side of said piezoelectric element opposite to said main frame to a position opposed to said movable member and fixedly connected at its one end to said lateral projection of said main frame; and a quadri-hinged parallel link mechanism fixed to said movable member and the other end of said sub frame, so as to displace said movable member in parallel to the direction of displacement of said piezoelectric element, wherein said first stopper member is fixed to the other end of said sub frame, and said second stopper member is fixed to said quadri-hinged parallel link mechanism in such a manner as to be supported on said movable member.

19. A device for magnifying displacement of an elongated piezoelectric element adapted to be displaced by application of voltage thereto, comprising:

a frame member extending along said piezoelectric element and having a lateral projection for supporting one end of said piezoelectric element with respect to a direction of displacement of said piezoelectric element;

a movable member mounted on the other end of said piezoelectric element with respect to the direction of displacement of said piezoelectric element;

means connected to said movable member and said frame member for magnifying the displacement of said piezoelectric element; and a quadri-hinged parallel link mechanism fixed to said movable member and said frame member, so as to displace said movable member in parallel to the direction of displacement of said piezoelectric element;

wherein said movable member is pressed on the other end of said piezoelectric element by an elastic force of said quadri-hinged parallel link mechanism to apply a given compression load to said piezoelectric element.

20. The device as defined in claim 19, wherein said frame member comprises a main frame extending along one side of said piezoelectric element and a sub frame extending along the other side of said piezoelectric element opposite to said main frame to a position opposed to said movable member; and said quadri-hinged parallel link mechanism is fixed also to said sub frame.

21. The device as defined in claim 20, wherein said quadri-hinged parallel link mechanism comprises a pair of link plates and a bridge portion for bridging said link plates; and said link plates comprise a pair of first parallel vertical portions to be fixed to opposite side surfaces of said sub frame, a pair of second parallel vertical portions to be fixed to opposite side surfaces of said movable member, a pair of first parallel horizontal portions and a pair of second parallel horizontal portions extending between said first parallel vertical portions and said second parallel vertical portions, and a pair of four elastically deformable hinge portions connecting said first and second parallel vertical portions with said first and second parallel vertical portions.

22. The device as defined in claim 21 further comprising a pair of connecting plates extending horizontally from said first parallel vertical portions, each of said connecting plates being fixed to a side surface of said sub frame and a side surface of said main frame.

23. The device as defined in claim 21, wherein said second parallel vertical portions are fixed to the opposite side surfaces of said movable member under the condition where said first parallel vertical portions are fixed to the opposite side surfaces of said sub frame, and said second parallel vertical portions are lifted against the elasticity of said hinge portions.

24. The device as defined in claim 21, wherein said first parallel vertical portions are fixed to the opposite side surfaces of said sub frame under the condition where said second parallel vertical portions are fixed to the opposite side surfaces of said movable member, and said first parallel vertical portions are lowered against the elasticity of said hinge portions.

25. A device for magnifying displacement of an elongated piezoelectric element adapted to be displaced by application of voltage thereto, comprising:

a main frame extending along one side of said piezoelectric element and having a lateral projection at its one end for supporting one end of said piezoelectric element with respect to a direction of displacement of said piezoelectric element;

a movable member mounted on the other end of said piezoelectric element with respect to the direction of displacement of said piezoelectric element;

means connected to said movable member and said main frame for magnifying the displacement of said piezoelectric element;

a sub frame extending along the other side of said piezoelectric element opposite to said main frame to a position opposed to said movable member and fixedly connected at its one end to said lateral projection of said main frame;

a link member fixed to said movable member and the other end of said sub frame, said link member comprising a quadri-hinged parallel link mechanism; and a connecting plate fixed at its one end portion to the other end of said main frame and at the other end portion to the other end of said sub frame.

26. The device as defined in claim 25, wherein said connecting plate extends horizontally from the other end of said sub frame to the other end of said main frame.

27. The device as defined in claim 25, wherein said quadri-hinged parallel link mechanism comprises a pair of parallel vertical portions fixed to a side surface of said sub frame and a side surface of said movable member, a pair of parallel horizontal portions extending between said parallel vertical portions, and four elastically deformable hinge portions connecting said parallel vertical portions with said parallel horizontal portions.

28. The device as defined in claim 25, wherein said main frame, said movable member and said sub frame have a reduced thickness at a portion where said quadri-hinged parallel link mechanism and said connecting plates are fixedly mounted.

29. A device for magnifying displacement of an elongated piezoelectric element adapted to be displaced by application of voltage thereto, comprising:

a main frame extending along one side of said piezoelectric element and having a lateral projection for supporting one end of said piezoelectric element with respect to a direction of displacement of said piezoelectric element;

a movable member mounted on the other end of said piezoelectric element with respect to the direction of displacement of said piezoelectric element;

means connected to said movable member and said main frame for magnifying the displacement of said piezoelectric element, said means for magnifying the displacement of said piezoelectric element comprising a first leaf spring fixed at its one end portion to said main frame, a second leaf spring fixed at its one end portion to said movable member and disposed in opposed relationship to said first leaf spring, and a rocking member fixedly connected to the other end of said first leaf spring and the other end of said second leaf spring and adapted to be rocked by flexing of said first and second leaf springs to be generated by the displacement of said piezoelectric element;

a separatable portion provided at at least one of opposed surfaces between said movable member and said piezoelectric element and between said piezoelectric element and said lateral projection of said main frame;

a sub frame extending along the other side of said piezoelectric element opposed to said main frame to a position opposed to said movable member and fixedly connected at its one end to said lateral projection of said main frame; and a quadri-hinged parallel link mechanism fixed to said movable member and the other end of said sub frame, so as to displace said movable member in parallel to the direction of displacement of said piezoelectric element.

* * * * *